(12) United States Patent
Kim

(10) Patent No.: US 11,819,109 B2
(45) Date of Patent: Nov. 21, 2023

(54) MAKEUP TABLE

(71) Applicants: Ki Kyung Kim, Gyeonggi-do (KR);
Mugunghwa Dongsan, Gyeonggi-do (KR)

(72) Inventor: Ki Kyung Kim, Gyeonggi-do (KR)

(73) Assignees: Mugunghwa Dongsan, Gyeonggi-do (KR); Ki Kyung Kim, Gyeonggi-do (KR)

( * ) Notice: Subject to any disclaimer, the term of this patent is extended or adjusted under 35 U.S.C. 154(b) by 994 days.

(21) Appl. No.: 16/628,359

(22) PCT Filed: Jan. 21, 2019

(86) PCT No.: PCT/KR2019/000821
§ 371 (c)(1),
(2) Date: Jan. 3, 2020

(87) PCT Pub. No.: WO2020/013411
PCT Pub. Date: Jan. 16, 2020

(65) Prior Publication Data
US 2020/0315323 A1      Oct. 8, 2020

(30) Foreign Application Priority Data

Jul. 9, 2018   (KR) ................. 10-2018-0079365
Jul. 26, 2018  (KR) ................. 10-2018-0087004
Jul. 26, 2018  (KR) ................. 10-2018-0087014

(51) Int. Cl.
*F25B 21/02*         (2006.01)
*H04R 1/02*          (2006.01)
(Continued)

(52) U.S. Cl.
CPC .............. *A45D 44/02* (2013.01); *A47B 37/00* (2013.01); *E05F 1/00* (2013.01); *E05F 15/603* (2015.01); *F25B 21/02* (2013.01); *H04R 1/025* (2013.01); *H04R 3/00* (2013.01); *A47B 2200/008* (2013.01); *E05Y 2900/20* (2013.01); *F25B 2321/0251* (2013.01); *H02J 7/02* (2013.01); *H04R 2420/00* (2013.01); *H04W 4/80* (2018.02)

(58) Field of Classification Search
CPC .. A45D 44/02; A47B 37/00; A47B 2200/008; E05F 1/00; F25B 21/02; E05Y 2900/20
See application file for complete search history.

(56) References Cited

FOREIGN PATENT DOCUMENTS

CN     202800696 U    3/2013
DE     9402481 U1     7/1994
(Continued)

OTHER PUBLICATIONS

The State Intellectual Property Office of People's Republic of China, Office Action of corresponding CN Patent Application No. 201980003444.1, dated Jan. 5, 2021.
(Continued)

*Primary Examiner* — Ana M Vazquez
(74) *Attorney, Agent, or Firm* — IP Legal Services, LLC

(57) ABSTRACT

The present invention provides a makeup table capable of providing a refrigerating function to store cosmetics required to be refrigerated and providing a dressing table having a new function and structure such that a choice of consumer preferences is broaden, usability and functionality are improved, and competitiveness of a product increases.

16 Claims, 22 Drawing Sheets

(51) Int. Cl.
  *A45D 44/02*  (2006.01)
  *E05F 15/603* (2015.01)
  *A47B 37/00*  (2006.01)
  *E05F 1/00*   (2006.01)
  *H04R 3/00*   (2006.01)
  *H04W 4/80*   (2018.01)
  *H02J 7/02*   (2016.01)

(56) References Cited

FOREIGN PATENT DOCUMENTS

| | | | |
|---|---|---|---|
| JP | 3116902 | U | 12/2005 |
| KR | 10-2001-0067781 | A | 7/2001 |
| KR | 200298899 | Y1 * | 1/2003 |
| KR | 10-2007-0080803 | A | 8/2007 |
| KR | 2009026909 | A * | 3/2009 |
| KR | 10-2009-0084122 | A | 8/2009 |
| KR | 10123558 | B1 * | 2/2013 |
| KR | 10-1596927 | B1 | 2/2016 |
| KR | 10-2016-0134184 | A | 11/2016 |
| KR | 20170021942 | A * | 3/2017 |

OTHER PUBLICATIONS

Japan Patent Office, Office Action of corresponding JP Patent Application No. 2020-502677, dated May 11, 2021.

* cited by examiner

MAKEUP TABLE

CROSS REFERENCE TO RELATED APPLICATIONS

This application is a National Stage Patent Application of PCT International Patent Application No. PCT/KR2019/000821 (filed on Jan. 21, 2019) under 35 U.S.C. § 371, which claims priority to Korean Patent Application Nos. 10-2018-0079365 (filed on Jul. 9, 2018), 10-2018-0087004 (filed on Jul. 26, 2018) and 10-2018-0087014 (filed on Jul. 26, 2018), the teachings of which are incorporated herein in their entireties by reference.

TECHNICAL FIELD

The present invention relates to a makeup table, and more particularly, to a makeup table capable of providing a refrigerating function to store cosmetics required to be refrigerated and providing a dressing table having a new function and structure beyond a function of a simple dressing table such that a choice of consumer preferences is broaden, competitiveness of a product increases, the stored cosmetics are easily taken out manually if necessary and are used, and usability and functionality are further improved.

BACKGROUND ART

Mobile In general, a dressing table is a kind of beauty supplies widely used in homes or beauty salons to create a fashion which corresponds to a neat appearance and fashion of a women.

In a related art, the dressing table includes a dressing table body, a mirror which is installed behind the dressing table body, and a drawer which is installed to be retractable in the dressing table body. The dressing table is configured such that a user puts on makeup in a state where cosmetics are stored and displayed on a drawer or an upper plate of the dressing table body and the user, usually a women, may put on makeup or the like using the cosmetics placed on the dressing table.

Recently, in order to prevent deterioration of cosmetics and to use the cosmetics while storing the cosmetics for a long time beyond a simple structure of the existing dressing table, the spread of cosmetic refrigerators to store cosmetics is increasing, and a dressing table with an integrated cosmetic refrigerator is suggested.

However, many functional cosmetics which are easily deteriorated by the main raw material of vegetable are likely to be deteriorated with a change of a temperature. However, most users store the cosmetics in a general dressing table for a long time.

As a method to solve the above-described problem, in the relate art, a cosmetic dedicated refrigerator is provided separately from the dressing table. However, the cosmetic dedicated refrigerator is expensive and bulky, and thus, the cosmetic dedicated refrigerator is used in a cosmetic store. Accordingly, it is difficult and cumbersome for the cosmetic dedicated refrigerator is separately provided for home use.

Therefore, recently, a refrigerating function-integrated dressing table described in the following patent documents has been proposed.

However, in the refrigerating function-integrated dressing table of the related art, a configuration having only the refrigerating function of cosmetics is integrated in the dressing table. Accordingly, a user's course is not considered, usability falls, there is a limit to provide a beautiful external design, and thus, there is problem that additional functions other than the refrigerating function are not provided.

DISCLOSURE

Technical Problem

Accordingly, the present invention is made in order to solve the problems of the related art, and an object thereof is to provide a makeup table capable of providing a refrigerating function to store cosmetics required to be refrigerated and providing a dressing table having a new function and structure beyond a function of a simple dressing table such that a choice of consumer preferences is broaden and competitiveness of a product increases.

In addition, anther object of the present invention is to provide a makeup table capable of fixing a device according to an automatic method or easily taking out and using stored cosmetics manually at the time of a user selection such that usability and functionality are further improved.

The problems of the present invention are not limited to those mentioned above, and other problems not mentioned are clearly understood by those skilled in the art from the following description.

Technical Solution

In order to achieve the objects of the present invention and other objects thereof, according to an aspect of the present invention, there is provided a makeup table including: a table body which includes an accommodation space of which one side is open; a support case having an opened upper portion which is provided in the accommodation space of the table body; a cosmetic accommodation case which is detachably installed in the support case, and accommodates and stores cosmetics; a cold generation means which is configured on one side of the cosmetic accommodation case and provides cold air to the cosmetic accommodation case; a driving means for lifting/lowering which is configured in the table body and lifts or lowers the cosmetic accommodation case; a case guide means which is configured between the support case and the cosmetic accommodation case and guides the lifting or lowering of the cosmetic accommodation case; an opening/closing panel which has a reflective surface for providing a mirror function and opens or closes an opening surface of the accommodation space of the table body; a driving means for opening/closing a panel which is configured in the table body and drives the opening/closing panel from a flat surface state to a standing state at a predetermined angle; a panel movement guide means which is configured in an upper portion of the accommodation space and guides a movement of the opening/closing panel by driving the driving means for opening/closing a panel; a power supply unit which is connected to supply power to the cold generation means, the driving means for lifting/lowering, and the driving means for opening/closing a panel; and a control panel which is configured on one side of the table body and controls the cold generation means, the driving means for lifting/lowering, the driving means for opening/closing a panel, and the power supply unit.

In the present invention, the driving means for lifting/lowering may include a linear motor of which a lifting/lowering shaft penetrates a bottom surface of the support case and is connected to the cosmetic accommodation case.

In the present invention, the driving means for lifting/lowering may include an opening slot which is open in a vertical direction in each of both side surface of the support case, a connection member which is formed on both side surface of the cosmetic accommodation case and protrudes through the opening slot, a feed screw member which is formed to be parallel with the opening slot on both side surfaces of the support case and to which the connection member is movably coupled, and a drive motor which is movable forward or rearward to rotate the feed screw member.

In the present invention, the driving means for lifting/lowering may include a forward/rearward rotation motor which is provided on one side of the support case and is rotatable forward or rearward, a rotating shaft which receives a forward/rearward rotation force of the forward/rearward rotation motor, and one or more contact driving bars of which one end portion is connected to the rotating shaft and the other end portion is provided to contact-support a rear surface of the support case, the other end portion being provided to obliquely contact-support the rear surface of the support case.

In the present invention, the case guide means may include one or more guide holes which are formed on a bottom surface of the support case, and a guide member of which one end is coupled to the cosmetic accommodation case such that the guide member is sliding-movable vertically through the guide hole.

In the present invention, the case guide means may include one or more guide grooves which are formed on one of facing surfaces of the support case and the cosmetic accommodation case, and one or more guide protrusions which are formed on the other of the facing surfaces of the support case and the cosmetic accommodation case and are guided along the guide grooves.

In the present invention, the driving means for opening/closing a panel may include a forward/rearward rotation motor which is provided on one side of the support case and is rotatable forward or rearward, a rotating shaft which is connected to a rotary shaft of the forward/rearward rotation motor, a rotation shaft which is formed on one side of a rear surface of the opening/closing panel, a connection frame of which one end portion is coupled to each of both end portions of the rotation shaft and the other end portion is coupled to the rotating shaft, and an interlocking link member of which one end portion is fixedly coupled to both end portions of the rotation shaft and the other end portion is rotatably coupled to an intermediate portion of both edges of the opening/closing panel or a side below the intermediate portion.

In the present invention, the driving means for opening/closing a panel may include a forward/rearward rotation motor which is provided on one side of the support case and is rotatable forward or rearward, a rotating shaft which is connected to a rotary shaft of the forward/rearward rotation motor via an interlocking track belt, is rotatably supported by one or more supports configured in the support case, and includes both end portions respectively having a pulley, a rotating pulley which is rotatably provided in front of each of both side surface of the support case, a driving track belt which connects the rotating pulley and the pulleys of both end portions of the rotating shaft to each other, and a movement block body which is fixed to the driving track belt and is connected to a guide roller constituting a panel movement guide means in an upper end portion of the movement block body.

In the present invention, the driving means for opening/closing a panel may include a forward/rearward rotation motor which is provided on one side of the support case and is rotatable forward or rearward, a gear which is provided in an end portion of the forward/rearward rotation motor, a linear movement frame which includes a rack gear engaging with the gear and linearly moves in a vertical direction, and a linear movement support frame which is installed in the support case, movably supports both end portions of the linear movement frame, and is rotatably coupled to an upper end portion on a rear surface side of the opening/closing panel in an upper end portion of the linear movement support frame.

In the present invention, the panel movement guide means may include a guide rail which is provided on both wall surfaces of an upper end portion of the accommodation space of the table body and both wall surfaces of an upper end portion of the support case, and a guide roller which is rotatably provided on both sides of a lower end portion of the opening/closing panel and is guided along the guide rail.

In the present invention, a heat insulating cover member may be provided in the opening/closing panel on a side facing the cosmetic accommodation case, a packing member may be provided in one of an edge periphery on a rear surface side of the heat insulating cover member and an upper end edge periphery of the accommodation space of the table body so as to prevent cold from escaping, and a stepped portion with which the packing member comes into close contact may be formed in the other of the upper end edge of the accommodation space of the table body and the edge periphery on the rear surface side of the heat insulating cover member.

In the present invention, the cold generation means may include a thermoelectric element which is provided on one side of the cosmetic accommodation case and generates a Peltier Effect, a cold sink of which one side communicates with the cosmetic accommodation case and the other side is provided on one surface of the thermoelectric element, a heat sink which is provided on the other surface of the thermoelectric element, and a heat dissipation fan which is provided in the heat sink and discharges generated heat, a grill may be formed on one surface of the support case facing the heat dissipation fan, and a bottom portion of the cosmetic accommodation case may be stepped to have different heights and may be configured to be divided into a plurality of partition walls.

In the present invention, the power supply unit may include a power wiring circuit module for supplying power to the cold generation means, the driving means for lifting/lowering, and the driving means for opening/closing a panel, and a power cable which is connected to supply the power wiring circuit module and is drawn out from the table body, the control panel may include a plurality of control operation units configured on one side of the table body to control the power wiring circuit module and a power light emitter which checks whether or not the power is applied to the power wiring circuit module, and the control operation unit may include a power button which is switched to turn on or off the power of the power wiring circuit module, a first motor control button which controls forward/rearward driving of the forward/rearward rotation motor of the driving means for lifting/lowering, and a second motor control button which controls forward/rearward driving of the forward/rearward rotation motor of the driving means for opening/closing a panel.

Moreover, in the present invention, the makeup table may further include a rear table frame which is configured to stand uprightly on a rear end portion of the table body and includes a plurality of mounting holes, a Bluetooth speaker configured to receive the power from the power wiring circuit module may be provided in the rear table frame, and a smartphone wireless charger configured to receive the power from the power wiring circuit module may be provided in the table body.

In addition, in the present invention, the makeup table may further include a manual opening/closing means which is configured in the opening/closing panel and is configured to be manually opened or closed to open or close the opening surface of the accommodation space of the table body.

In the present invention, the opening/closing panel may include an edge frame which forms an opening portion having a predetermined size inside the edge frame, a manual auxiliary opening/closing panel which is provided in the opening portion inside the edge frame, a hinge means which is provided on both side of one end portion of the manual auxiliary opening/closing panel and is rotatably fixed to the edge frame such that the manual auxiliary opening/closing panel rotates with the one end portion as an axis, an elastic member which is provided in the hinge means and applies an elastic force to the manual auxiliary opening/closing panel in an opening direction, and a locking-unlocking unit which is provided in a center portion of the other end of the manual auxiliary opening/closing panel and the edge frame and is configured to lock or unlock the other end portion of the manual auxiliary opening/closing panel.

In the present invention, the opening/closing panel may include a monitor-integrated computer or a tablet including software and hardware for executing at least one of the functions of wired/wireless internet, Bluetooth, or mirroring.

Advantageous Effects

According to the makeup table of the present invention, it possible to provide refrigerating function to store the cosmetics required to be refrigerated, the opening/closing panel covering the cosmetic accommodation case is configured as a mirror, a display panel, or the like to improve functionality, and it is possible to minimize movements of the cosmetics to be used to improve performance and convenience.

Moreover, in the present invention, a functional makeup table is provided which adds a function which can be associated with a smart phone terminal which is used by most people and can perform music or smartphone charging at the same time, and thus, a choice of consumer preferences is broaden and competitiveness of a product increases.

In addition, according to the present invention, the cosmetics can be easily taken out through the manual auxiliary opening/closing panel, and thus, usability and functionality can be further improved.

Effects of the present invention are not limited to those mentioned above, and other problems not mentioned will be clearly understood by those skilled in the art from the following description.

BEST MODE FOR INVENTION

Figure 1:
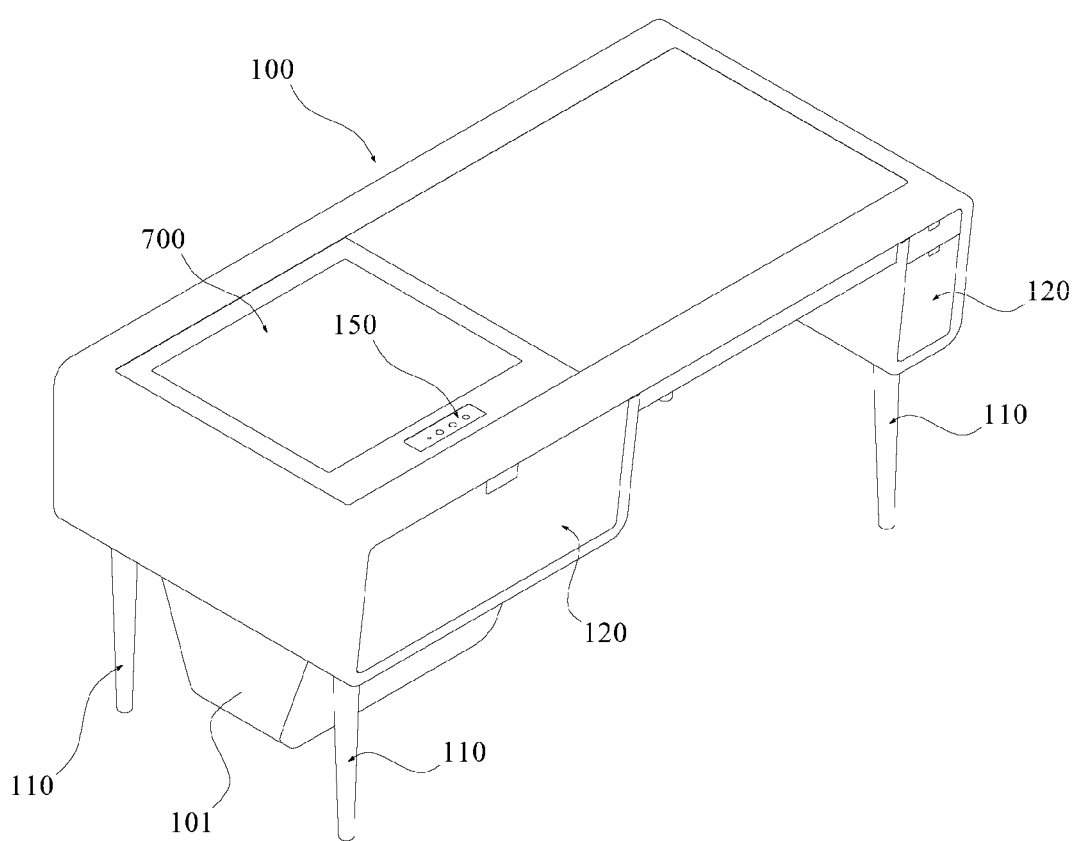
FIG. 1 is a view showing a makeup table according to an embodiment of the present invention and shows a state where an opening/closing panel is closed.

The present invention provides a makeup table including: a table body which includes an accommodation space of which one side is open; a support case having an opened upper portion which is provided in the accommodation space of the table body; a cosmetic accommodation case which is detachably installed in the support case, and accommodates and stores cosmetics; a cold generation means which is configured on one side of the cosmetic accommodation case and provides cold air to the cosmetic accommodation case; a driving means for lifting/lowering which is configured in the table body and lifts or lowers the cosmetic accommodation case; a case guide means which is configured between the support case and the cosmetic accommodation case and guides the lifting or lowering of the cosmetic accommodation case; an opening/closing panel which has a reflective surface for providing a mirror function and opens or closes an opening surface of the accommodation space of the table body; a driving means for opening/closing a panel which is configured in the table body and drives the opening/closing panel from a flat surface state to a standing state at a predetermined angle; a panel movement guide means which is configured in an upper portion of the accommodation space and guides a movement of the opening/closing panel by driving the driving means for opening/closing a panel; a power supply unit which is connected to supply power to the cold generation means, the driving means for lifting/lowering, and the driving means for opening/closing a panel; and a control panel which is configured on one side of the table body and controls the cold generation means, the driving means for lifting/lowering, the driving means for opening/closing a panel, and the power supply unit.

MODE FOR INVENTION

Additional objects, features, and advantages of the present invention can be more clearly understood from the following detailed descriptions and the accompanying drawings.

Prior to the detailed descriptions of the present invention, the present invention may be variously modified and may have various embodiments. Examples described below and shown in the drawings are intended to limit the present invention to specific embodiments, and it is to be understood that the present invention includes all modifications, equivalents, and substitutes included in the spirit and technical scope of the present invention.

When an element is "coupled" or "connected" to another element, it should be understood that a third element may be present between the two elements although the element may be directly coupled or connected to the other element. Meanwhile, when an element is "directly coupled" or "directly connected" to another element, it should be understood that no element is present between the two elements.

Terms used in the present specification are for a purpose of describing particular embodiments only and is not intended to be limiting of the invention. An expression of the singular number may include an expression of the plural number unless clearly defined otherwise in the context. In addition, in the present specification, it will be further understood that terms "comprise" and "include" specify the presence of stated features, integers, steps, operations, elements, components, and/or combinations thereof, but do not preclude the presence or addition of one or more other features, integers, steps, operations, elements, components, and/or combinations thereof.

In addition, terms " . . . portion", " . . . unit", " . . . module", and or like described in the specification mean a unit which processes at least one function or operation, which may be implemented in hardware or software or a combination of hardware and software.

In addition, when embodiments are described reference to the attached drawings, the same reference numerals are assigned to the same or similar elements regardless of their reference numerals, and redundant descriptions thereof are omitted. Further, in the following description, if a detailed description of known techniques associated with the present disclosure would unnecessarily obscure the gist of the present disclosure, detailed description thereof will be omitted.

Hereinafter, a makeup table according to an embodiment of the present invention will be described in detail with reference to FIGS. 1 to 9.

Figure 2:
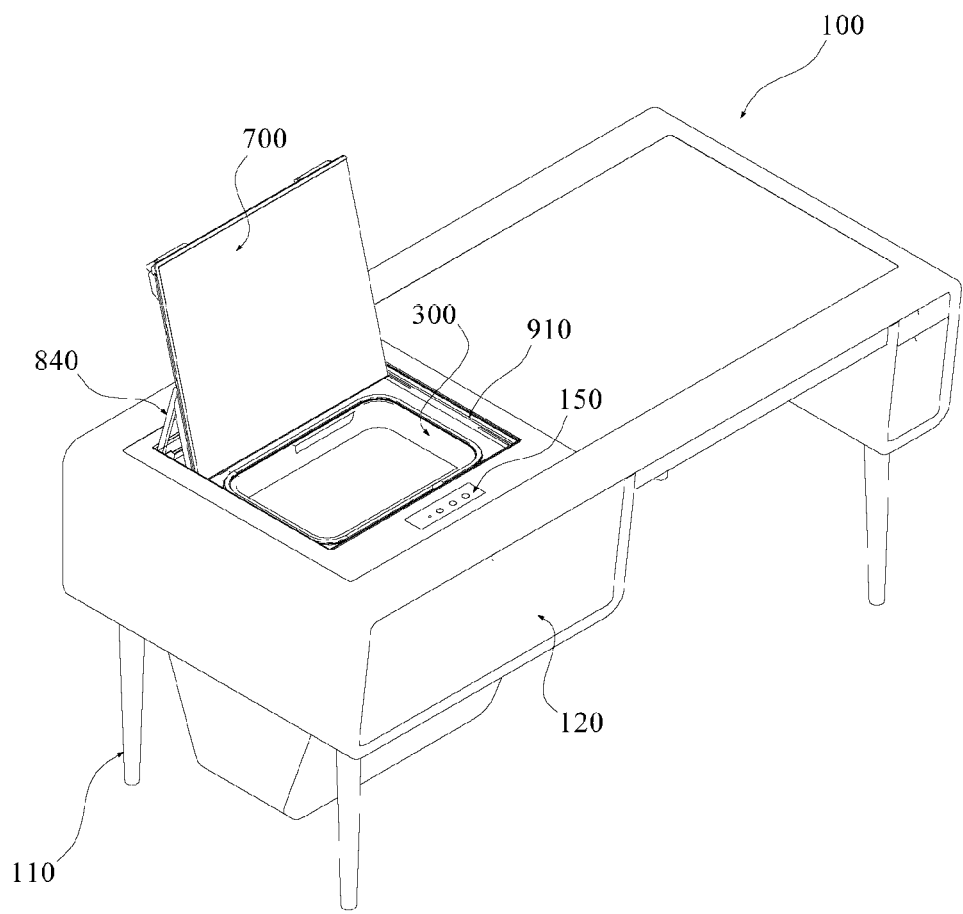
FIG. 2 is a view showing the makeup table according to the embodiment of the present invention and shows a state where the opening/closing panel is opened.
Figure 3:
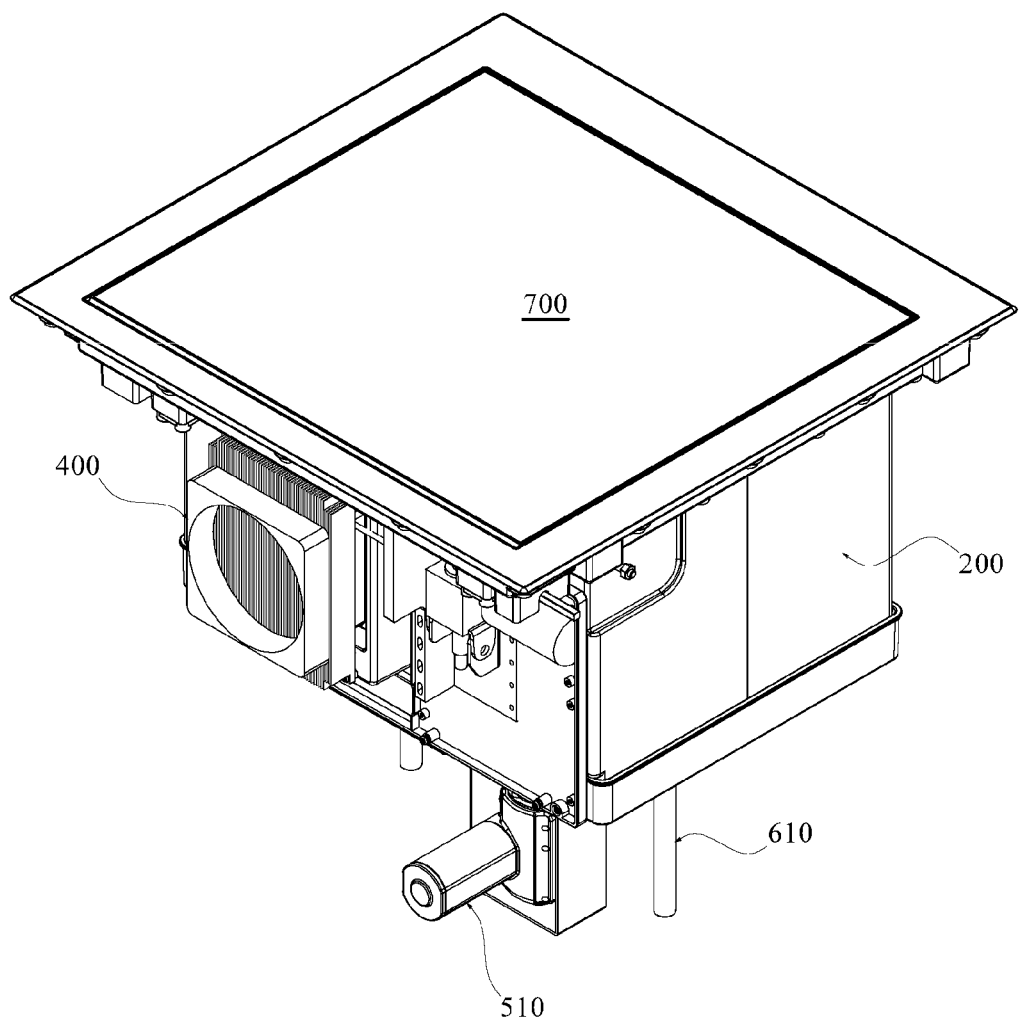
FIG. 3 is a perspective view when internal components of the makeup table according to the embodiment of the present invention are viewed from above.
Figure 4:
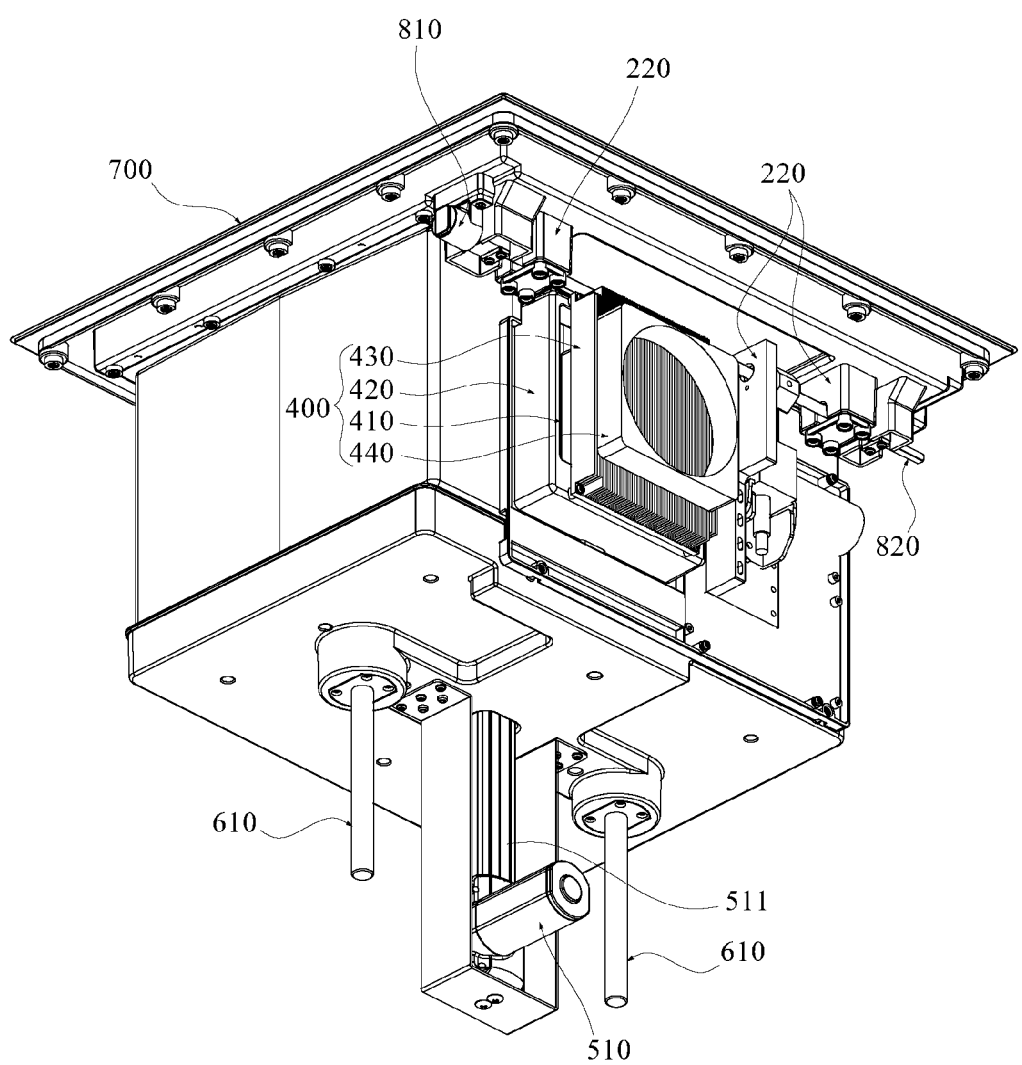
FIG. 4 is a perspective view when the internal components of the makeup table according to the embodiment of the present invention are viewed from one side of a lower portion thereof.
Figure 5:
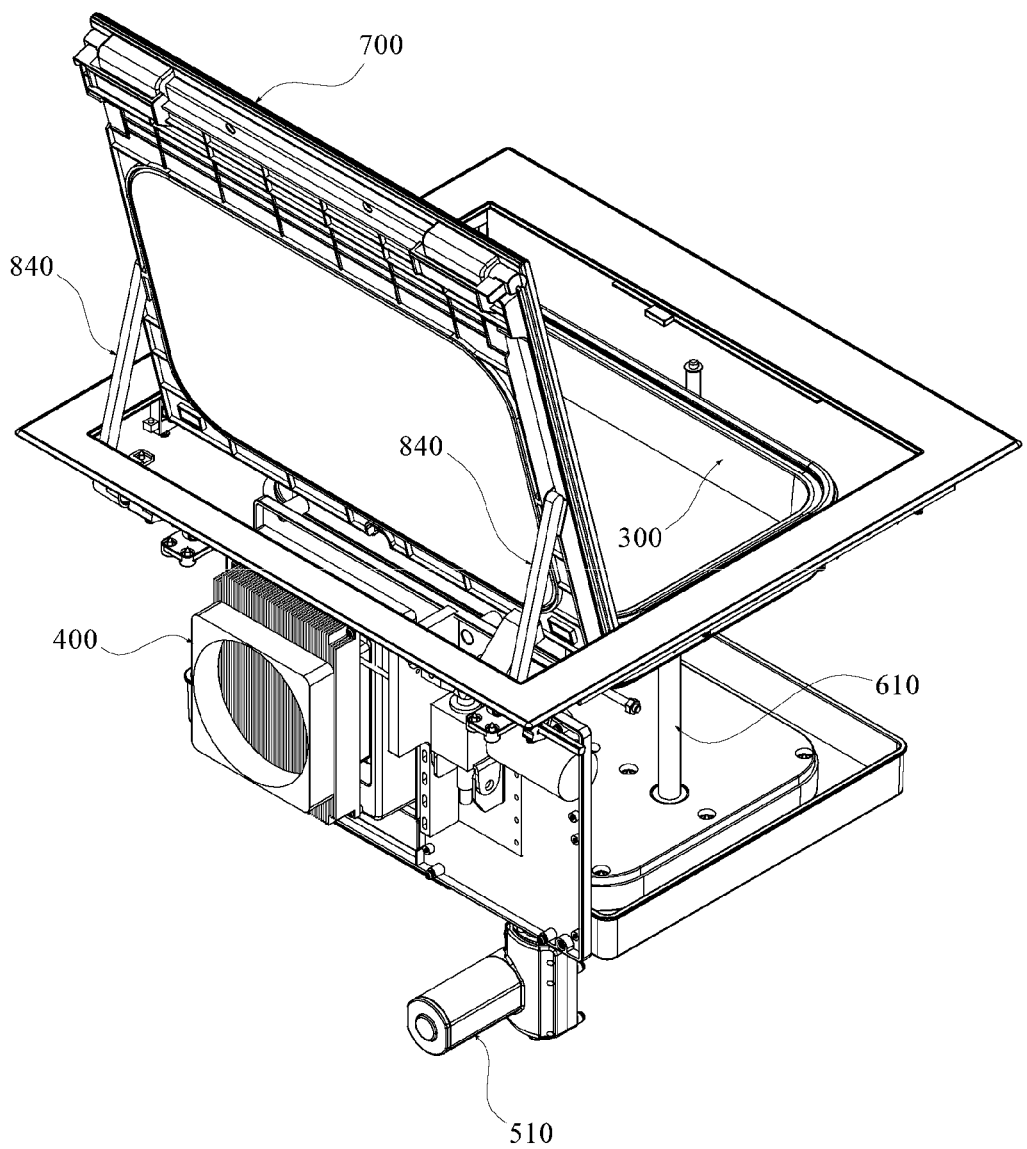
FIG. 5 is a perspective view when the internal components of the makeup table according to the embodiment of the present invention are viewed from one side of an upper portion thereof.
Figure 6:
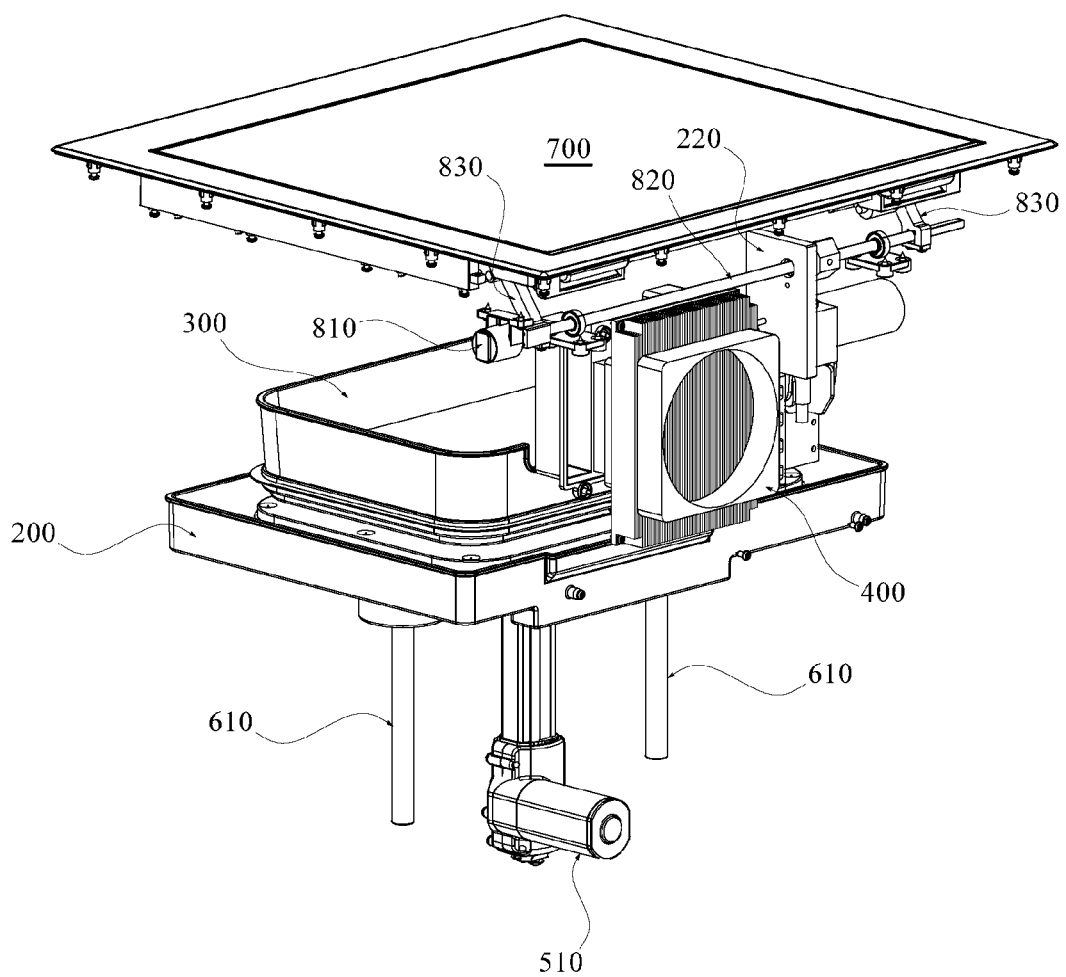
FIG. 6 is a perspective view when the internal components are viewed from one side of a rear portion of the makeup table in a state where a support case constituting the makeup table according to the embodiment of the present invention is omitted.
Figure 7:
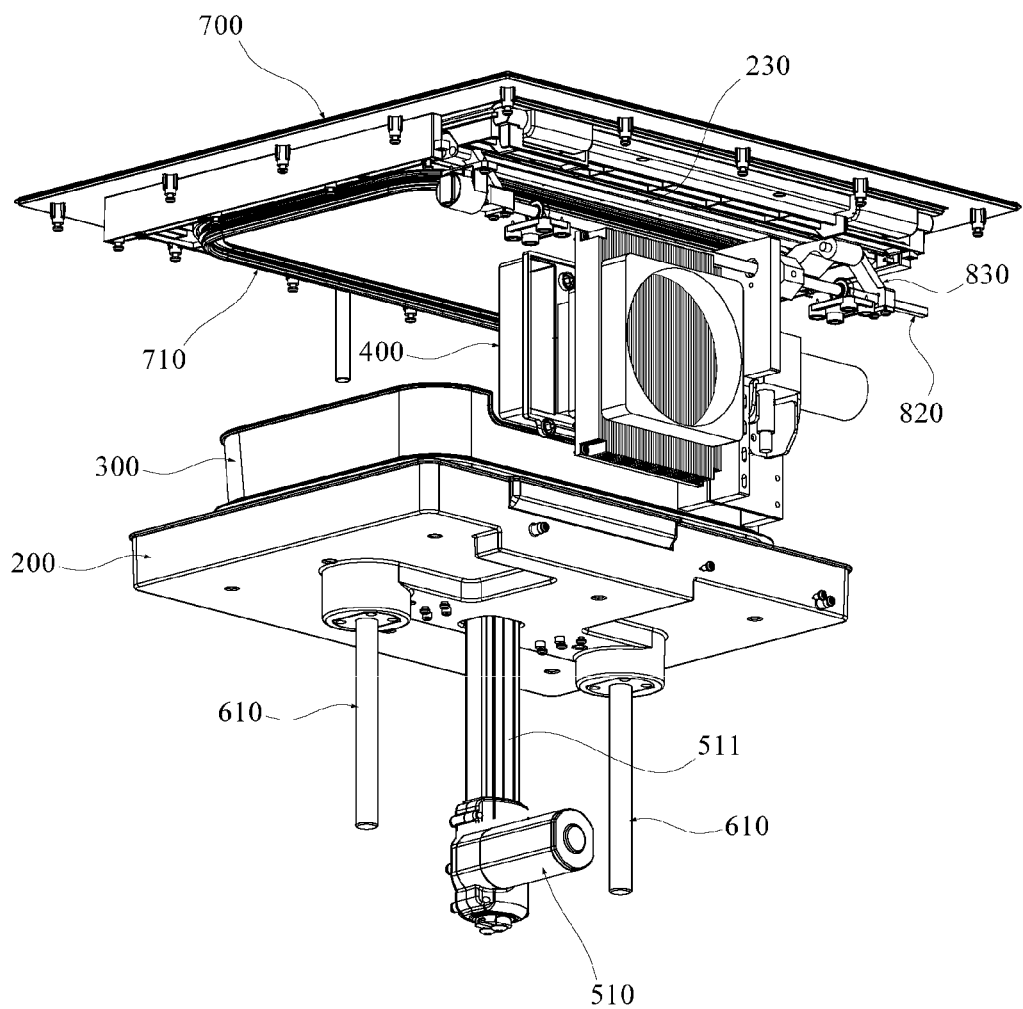
FIG. 7 is a perspective view when the internal components are viewed from the other side of a rear portion of the makeup table in the state where the support case constituting the makeup table according to the embodiment of the present invention is omitted.
Figure 8:
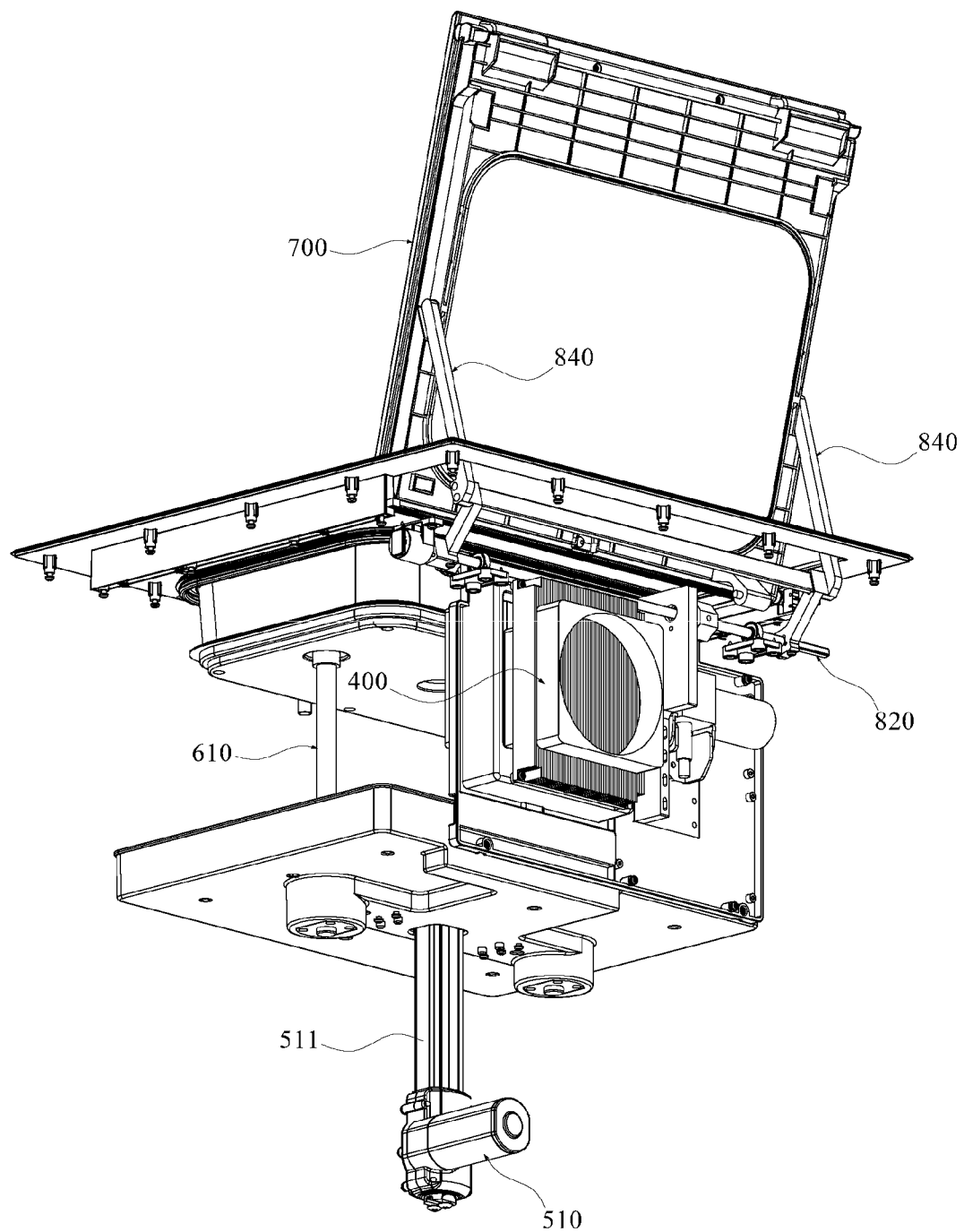
FIG. 8 is a perspective view when the internal components are viewed from the one side of the rear portion of the makeup table in a state where the opening/closing panel in the makeup table according to the embodiment of the present invention is opened.
Figure 9:
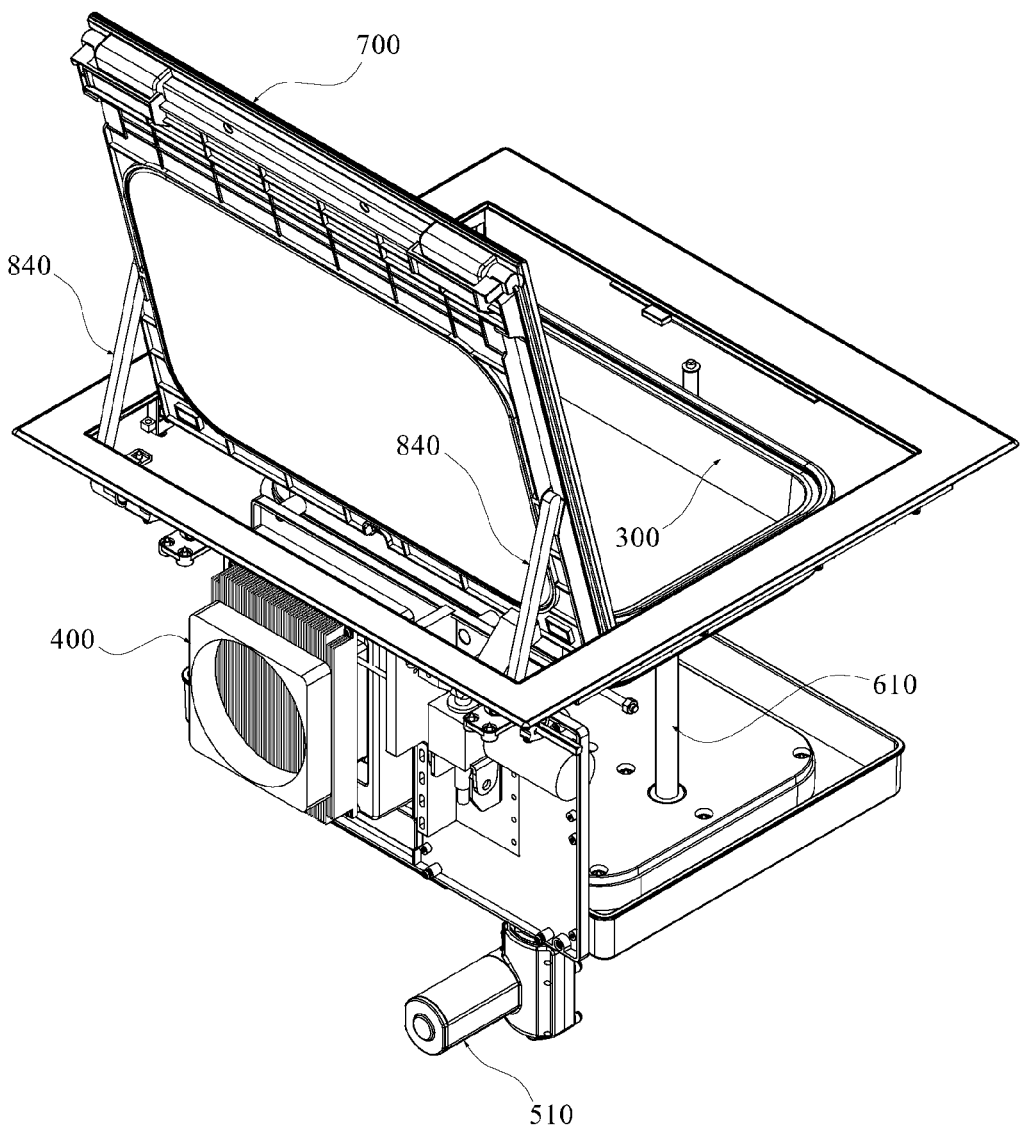
FIG. 9 is a perspective view when the internal components are viewed from the other side of the rear portion of the makeup table in a state where the opening/closing panel constituting the makeup table according to the embodiment of the present invention is opened.

FIG. 1 is a view showing a makeup table according to an embodiment of the present invention and shows a state where an opening/closing panel is closed, FIG. 2 is a view showing the makeup table according to the embodiment of the present invention and shows a state where the opening/closing panel is opened, FIG. 3 is a perspective view when internal components of the makeup table according to the embodiment of the present invention are viewed from above, FIG. 4 is a perspective view when the internal components of the makeup table according to the embodiment of the present invention are viewed from one side of a lower portion thereof, FIG. 5 is a perspective view when the internal components of the makeup table according to the embodiment of the present invention are viewed from one side of an upper portion thereof, FIG. 6 is a perspective view when the internal components are viewed from one side of a rear portion of the makeup table in a state where a support case constituting the makeup table according to the embodiment of the present invention is omitted, FIG. 7 is a perspective view when the internal components are viewed from the other side of a rear portion of the makeup table in the state where the support case constituting the makeup table according to the embodiment of the present invention is omitted, FIG. 8 is a perspective view when the internal components are viewed from the one side of the rear portion of the makeup table in a state where the opening/closing panel in the makeup table according to the embodiment of the present invention is opened, and FIG. 9 is a perspective view when the internal components are viewed from the other side of the rear portion of the makeup table in a state where the opening/closing panel constituting the makeup table according to the embodiment of the present invention is opened.

As shown in FIGS. 1 to 9, the makeup table according to an embodiment of the present invention includes: a table body 100 which has table legs 110 on a lower portion thereof and includes an accommodation space of which one side is open; a box-shaped support case 200 having an opened upper portion which is provided in the accommodation space of the table body 100; a cosmetic accommodation case 300 which is detachably installed in the support case 200, and accommodates and stores cosmetics; a cold generation means 400 which is configured on one side of the cosmetic accommodation case 300 and provides cold air to the cosmetic accommodation case 300; a driving means for lifting/lowering which is configured in the table body 100 and lifts or lowers the cosmetic accommodation case 300; a case guide means which is configured between the support case 200 and the cosmetic accommodation case 300 and guides the lifting or lowering of the cosmetic accommodation case 300 by driving the driving means for lifting/lowering; an opening/closing panel 700 which covers an opening surface of the accommodation space of the table body 100; a driving means for opening/closing a panel which is configured in the table body 100 and drives the opening/closing panel 700 from a flat surface state to a standing state at a predetermined angle; a panel movement guide means which is configured in the table body 100 and guides a movement of the opening/closing panel 700 by driving the driving means for opening/closing a panel; a power supply unit (not shown) which is connected to supply power to the cold generation means 400, the driving means for lifting/lowering, and the driving means for opening/closing a panel; and a control panel 150 which is configured on one side of the table body 10 and controls the cold generation means, the driving means for lifting/lowering, the driving means for opening/closing a panel, and the power supply unit. A reference numeral 101 indicates a cover housing which covers the support case 200.

The table body 100 may have various shapes and sizes, and the table body 100 may include one or more holders 120 that are retractably received.

As shown in FIG. 3, not only the cosmetic accommodation case 300 is accommodated to be installed in the box-shaped support case 200 having an opened upper portion but also some components described below are coupled to box-shaped support case 200.

In addition, a grill (not shown) for discharging heat generated by a blower fan of the cold generation means 400 described in detail later to the outside is provided on a rear surface (a surface facing the blower fan of the cold generation means 400 described later) of the support case 200.

Next, the cosmetic accommodation case 300 is not particularly limited as long as the cosmetic accommodation case 300 can be accommodated in the support case 200. It is preferable that the cosmetic accommodation case 300 has a shape and a size to be installed to match an inner space of the support case 200.

Moreover, in the drawings, the cosmetic accommodation case 300 is formed to have a box shape having an opened upper portion. However, it is preferable that the cosmetic accommodation case 300 is formed to have a plurality of stepped surfaces having different heights of bottom portions such that cosmetics having different heights are accommodated by height and a user easily can take out the cosmetics.

In addition to the configuration in which the cosmetic accommodation case 300 has the stepped bottom portion, it is more preferable that a partition wall slidable to adjust a width is configured. Accordingly, a state where the cosmetics are stored to stand uprightly is stably maintained and the stored cosmetics can be stored to be separated from each other.

Next, an embodiment of the cold generation means 400 which is configured on one side of the cosmetic accommodation case 300 and provides cold air to the inside of the cosmetic accommodation case 300 such that the cosmetics are stored to be cold will be described.

As shown in the drawings, the cold generation means 400 includes a thermoelectric element 410 which is provided on one side (rear side) of the support case 200 and generates a Peltier Effect, a cold sink 420 of which one side (side on which the cold air is generated) is exposed to communicate with the inside of the cosmetic accommodation case 300 (refer to FIGS. 6 and 7) and the other side is provided on one surface of the thermoelectric element 410, a heat sink 430 which is provided on the other surface of the thermoelectric element 410, and a heat dissipation fan 440 which is provided on the other surface of the heat sink 430 and discharges generated heat to the outside through the grill of the support case 200.

The thermoelectric element 410, the cold sink 420, the heat sink 430, and the cooling fan 440 are fastened by a general fastening member, for example, a bolt or screw to constitute an integrated cooling module, and the integrated cooling module is assembled to the support case 200 to be easily assembled.

As shown in FIGS. 4 to 9, the driving means for lifting/lowering of a first embodiment configured to lift or lower the cosmetic accommodation case 300 includes a linear motor 510 of which a lifting/lowering shaft (linear shaft) 511 penetrates a bottom surface of the support case 200 and is connected to the cosmetic accommodation case 300.

Meanwhile, a second embodiment of the driving means for lifting/lowering will be described in detail with reference to FIGS. 10 and 11.

Figure 10:
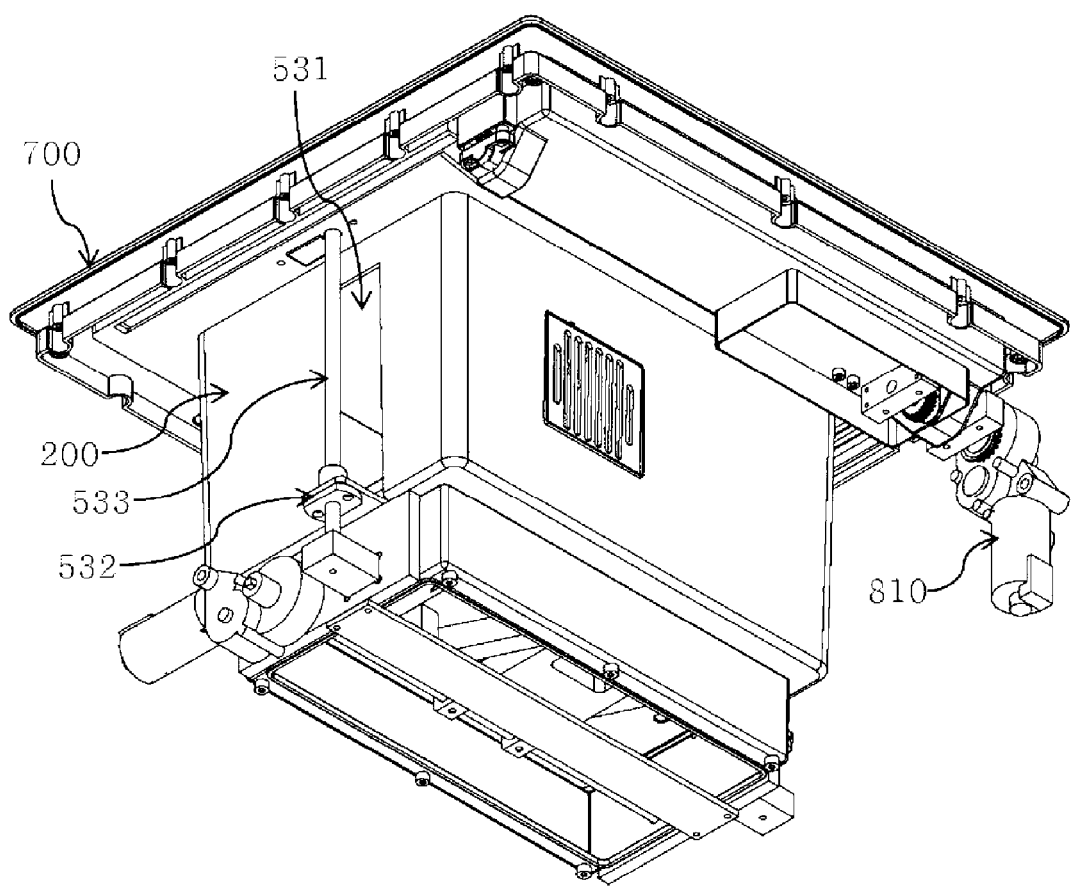
FIG. 10 is a perspective view when components constituting a second embodiment of a driving means for lifting/lowering constituting the makeup table according to the embodiment of the present invention are viewed from the one side of the rear portion.
Figure 11:
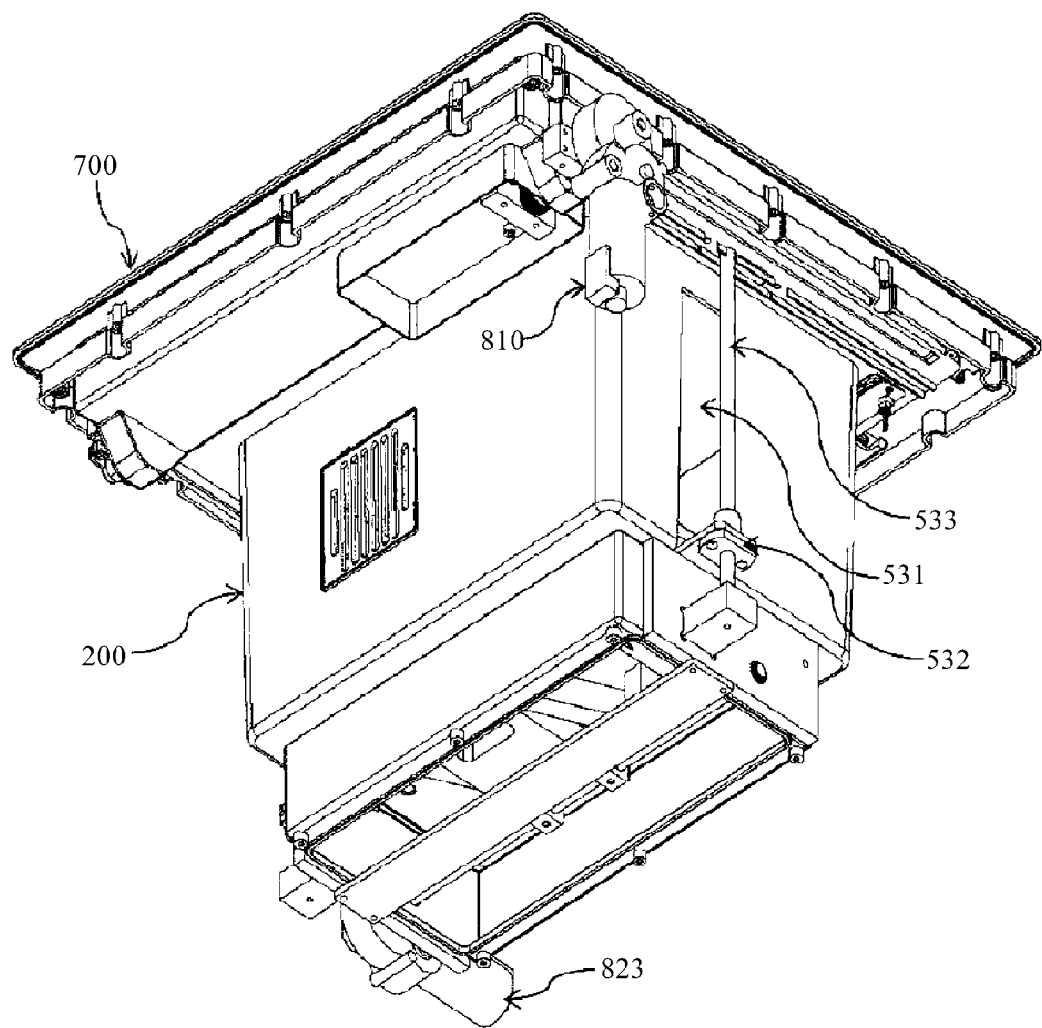
FIG. 11 is a perspective view when the components constituting the second embodiment of the driving means for lifting/lowering constituting the makeup table according to the embodiment of the present invention are viewed from the other side of the rear portion.

FIG. 10 is a perspective view when components constituting the second embodiment of a driving means for lifting/lowering constituting the makeup table according to the embodiment of the present invention are viewed from the one side of the rear portion, and FIG. 11 is a perspective view when the components constituting the second embodiment of the driving means for lifting/lowering constituting the makeup table according to the embodiment of the present invention are viewed from the other side of the rear portion. In the following descriptions of the driving means for lifting/lowering of the second embodiment, the same reference numerals are assigned to components which are the same as or similar to the components of the driving means for lifting/lowering of the first embodiment, and detail descriptions thereof are omitted.

As shown in FIGS. 10 and 11, the driving means for lifting/lowering of the second embodiment includes an opening slot 531 which is open in a vertical direction in each of both side surface of the support case 200, a connection member 532 which is formed on both side surface of the cosmetic accommodation case 300 and protrudes through the opening slot 531, a feed screw member 533 which is formed to be parallel with the opening slot 531 on both side surfaces of the support case 200 and to which the connection member 532 is movably coupled, and a movable motor 510 which is movable forward or rearward to rotate the feed screw member 533. In this case, a gear train (that is, gear train for power transmission)) may be configured between the movable motor 510 and the feed screw member 533

Here, the driving means for lifting/lowering of the second embodiment may include only a linear motor for lifting or lowering the connection member 532 instead of the feed screw member 533 and the movable motor 510, and in this case, a guide rod for guiding lifting or lowering of the one connection member (532) may be provided on a side opposite to a side on which the linear motor is configured.

Next, according to a first embodiment, the case guide means for guiding the lifting or lowering of the cosmetic accommodation case 300 by driving the driving means for lifting/lowering includes one or more guide holes which are formed on a bottom surface of the support case 200, and a guide member (guide rod) 610 of which one end is coupled to the cosmetic accommodation case 300 such that the guide member is sliding-movable vertically through the guide hole.

Here, a linear sliding bearing (not shown) for supporting the guide member 610 such that the guide member 601 smoothly slides is provided between the guide hole and the guide member 610.

As shown in the drawings, preferably, the guide hole and the guide member 610 are connected to both sides of the cosmetic accommodation case 300 with the lifting/lowering shaft 511 as a center.

In this case, in a driving means for lifting/lowering of a second embodiment, the case guide means may be omitted, and a case guide means of a second embodiment described below may be configured.

In the driving means for lifting/lowering and the case guide means configured as described above, if the linear motor 510 rotates in a forward direction or a rearward direction (a lifting direction of the cosmetic accommodation case) according to an operation of the user through control panel 150, the lifting/lowering shaft 5111 is lifted or lowered, and thus, the cosmetic accommodation case 300 is lifted or lowered.

In this case, the operation of the driving means for lifting/lowering is interlocked with the driving means for opening/closing a panel described in detail later to open (opening having an opening angle according to an operation signal) the opening/closing panel 700 constituted by an LED display panel.

Next, the opening/closing panel 700 may be formed of a simple acrylic or glass panel having a reflective surface in consideration of manufacturability and weight, and may be formed of an LED display panel as another example.

Specifically, in a case where the opening/closing panel 700 is formed of an LED display panel, the opening/closing panel 700 may include a monitor-integrated computer or a tablet which has a reflective surface for providing a mirror function and is configured to include software and hardware for executing at least one of the functions of wired/wireless internet, Bluetooth, or mirroring and may include an opening/closing panel including a tablet capable of performing a mirror mode.

The opening/closing panel 700 may be configured as an integrated computer monitor such as a USB port, a Wi-Fi module, a communication module, an internal memory connection slot, or the like.

In this way, in a case where the opening/closing panel 700 includes the opening/closing panel of a monitor-integrated computer or a tablet, a front reflective surface provides a function as a mirror (mirror) or provides a function as a mirror by performing the mirror mode, and thus, the opening/closing panel 700 can be used as a monitor-integrated computer, such as mirroring with a smartphone or pairing a Bluetooth keyboard and a mouse to perform simple document operations.

Subsequently, a side on which the cold air is generated faces on a rear surface (a side facing the cosmetic accommodation case 300) of the integrated computer monitor, and thus, a heat insulating cover member (not shown) is formed on the rear surface so as to protect against cold air.

In addition, in another embodiment, the front surface of the opening/closing panel 700 may be a reflective surface when opened to function as a mirror, and may be configured as a display panel which may display a predetermined image by connecting a mobile memory to the opening/closing pane 700.

Subsequently, a rubber packing member 710 (refer to FIG. 7) may be further provided in an edge periphery on the rear surface (that is, the rear surface of the heat insulating cover member) side of the opening/closing panel 700 so as to prevent cold from escaping, and a stepped portion with which the packing member provided in the edge of the opening/closing panel 700 comes into close contact may be provided in the upper end edge of the accommodation space of the table body 100. Here, the packing member may be provided on the upper end edge of the accommodation space of the table body 100.

In addition, in the present invention, a cover member (not shown) may be further provided, which is configured to be located below the flat surface of the table body 100 when the opening/closing panel 700 is in the flat surface state with respect to the table body 100 so as to protect the opening/closing panel 700. The cover member may be configured to be flush with the flat surface of the table body 100 in a state where the opening/closing panel 700 is covered with the cover member, and the cover member may include a gripping knob for easily removing the cover member.

For example, the gripping knob may be a detachable groove which is recessed inward from one edge of the cover member, or may be a detachable knob which is rotatable with one end portion as an axis, has the other end portion as a free end, and is configured to be flush with the upper surface of the cover member when received. However, the present invention is not limited to this.

Next, in a first embodiment, the driving means for opening/closing a panel for driving the opening/closing panel 700 from a flat surface state to a standing state at a predetermined angle includes a forward/rearward rotation motor 810 which is provided on one side of the support case 200 and is rotatable forward or rearward, a rotating shaft 820 which is connected to a rotary shaft of the forward/rearward rotation motor 810 and is rotatably supported by one or more supports 220 configured in the support case 200, a connection frame 830 of which one end portion is coupled to each of both end portions of the rotation shaft 230 coupled to the rear surface side of the opening/closing panel 700 and the other end portion is coupled to the rotating shaft 820, and an interlocking link member 840 of which one end portion is fixedly coupled to both end portions of the rotation shaft 230 and the other end portion is rotatably coupled to an intermediate portion of both edges of the opening/closing panel 700 or a side below the intermediate portion.

The rotating shaft 820 includes a bearing member and a rolling member which is rotatably supported by the support 220.

Meanwhile, a second embodiment of the driving means for opening/closing a panel will be described in detail with reference to FIGS. 12 to 14.

Figure 12:
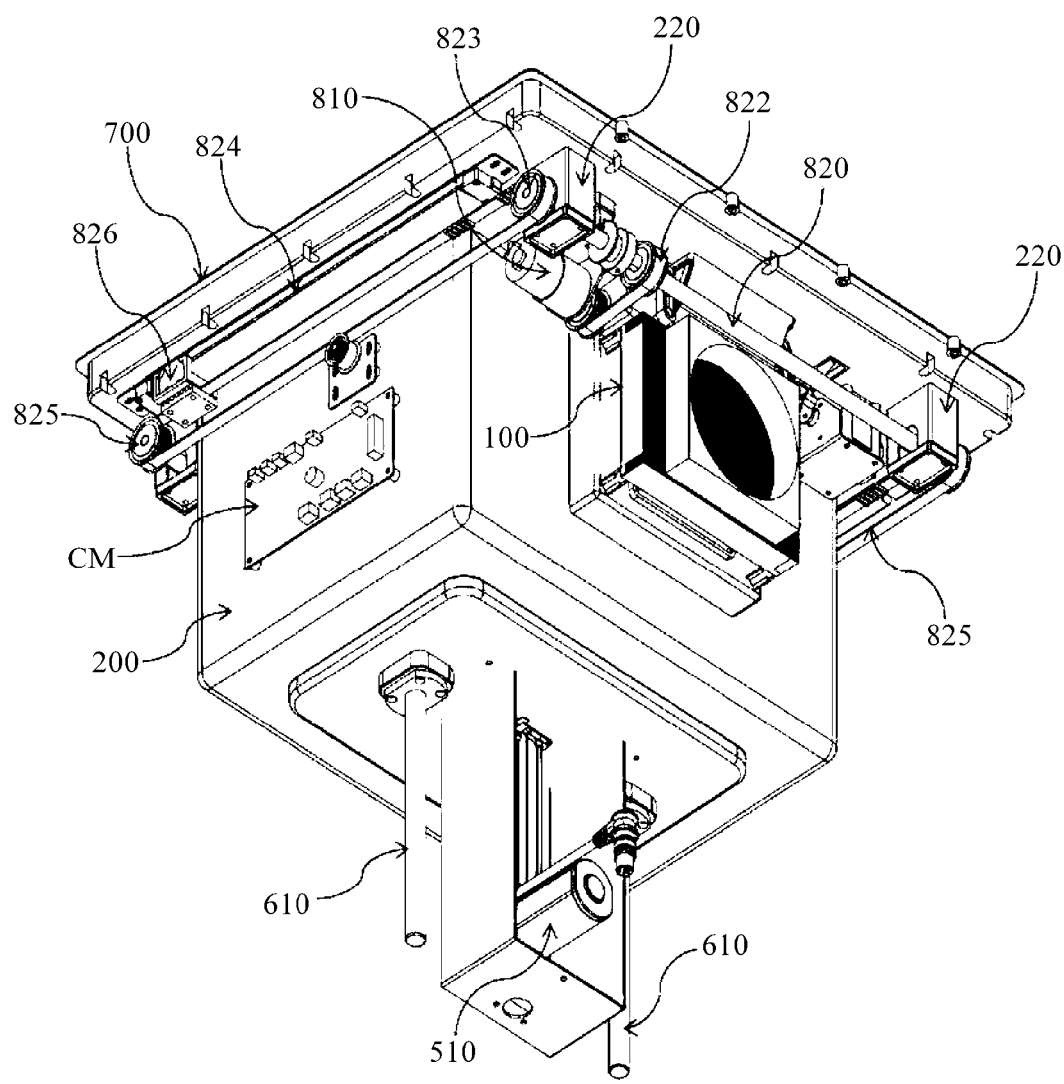
FIG. 12 is a perspective view when internal components including a driving means for opening/closing a panel of the second embodiment constituting the makeup table according to the embodiment of the present invention are viewed from one side of the rear portion.
Figure 13:
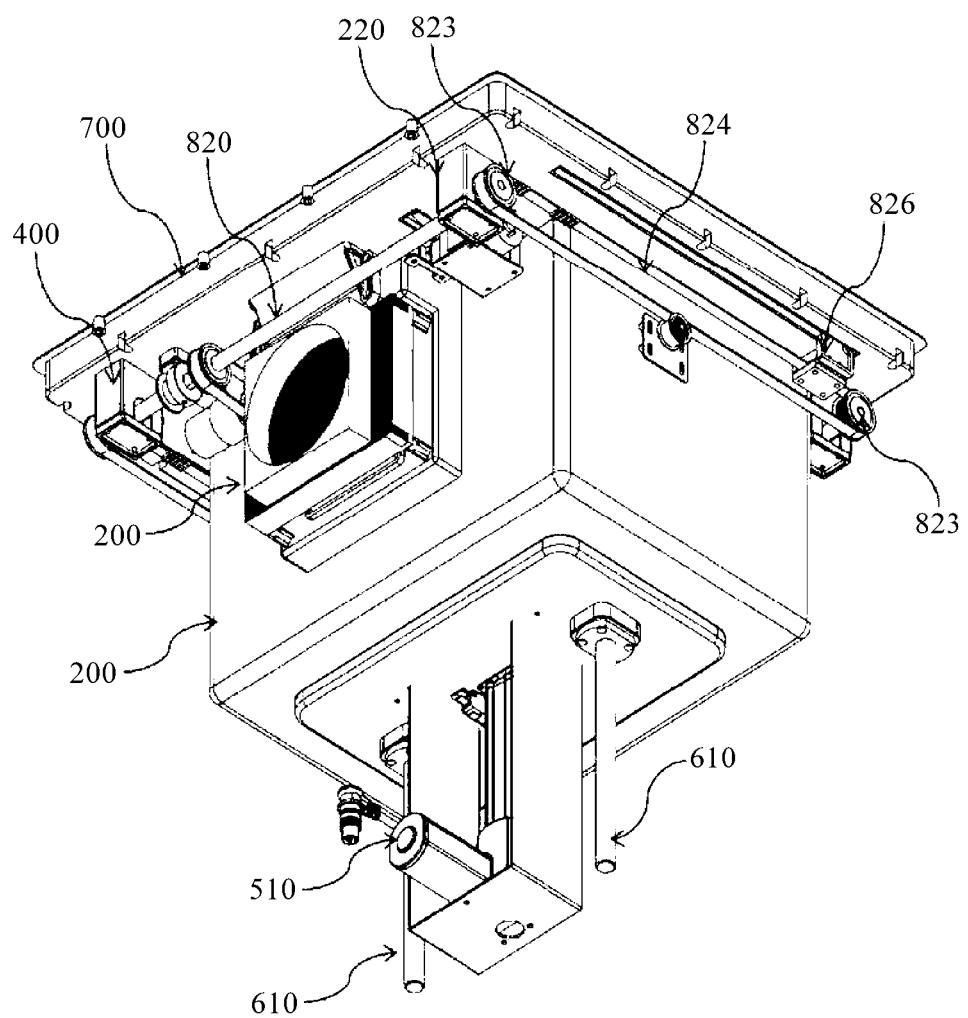
FIG. 13 is a perspective view when the internal components including the driving means for opening/closing a panel of the second embodiment constituting the makeup table according to the embodiment of the present invention are viewed from the other side of the rear portion.
Figure 14:
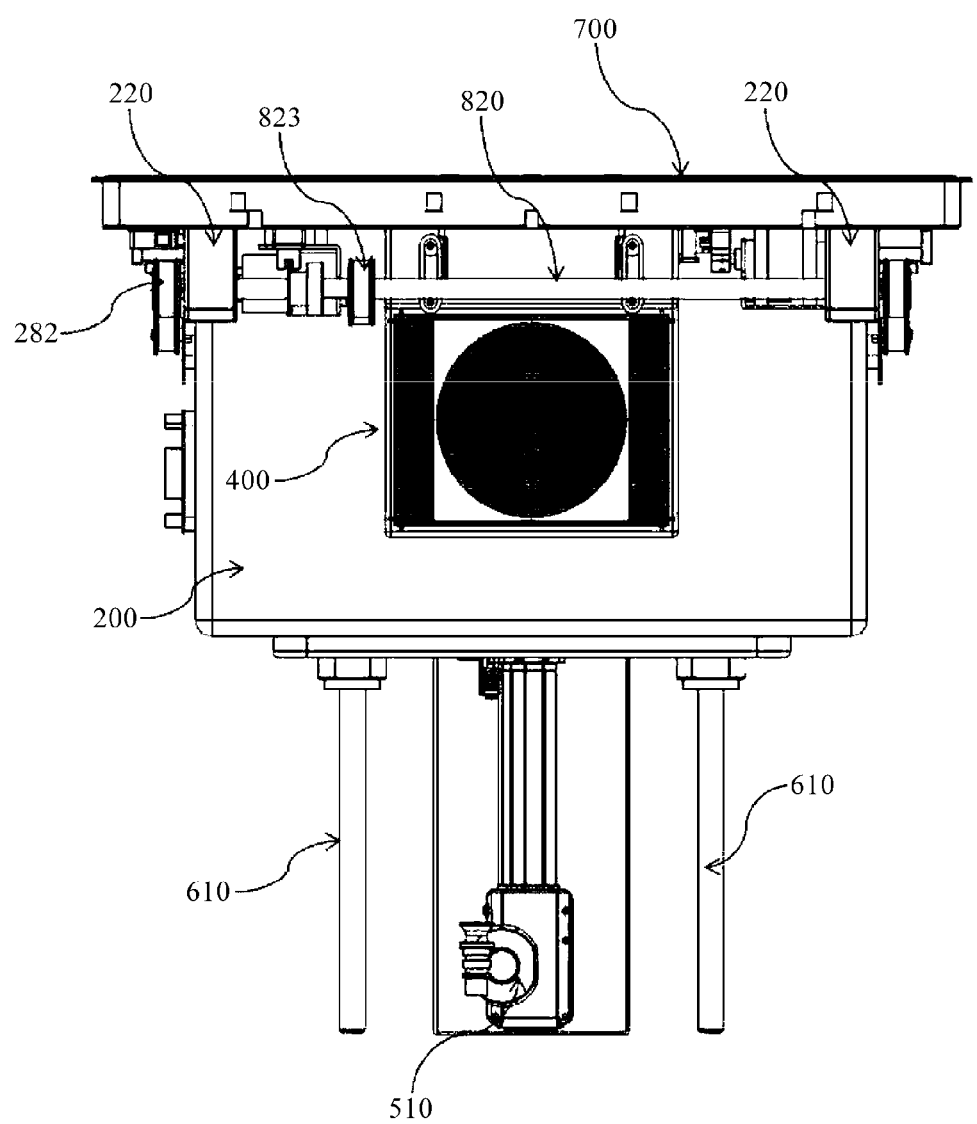
FIG. 14 is a front view when components including the second embodiment of a driving means for opening/closing a panel of the second embodiment constituting the makeup table according to the embodiment of the present invention are viewed from one side.

FIG. 12 is a perspective view when components including a driving means for opening/closing a panel of the second embodiment constituting the makeup table according to the embodiment of the present invention are viewed from one side of the rear portion, FIG. 13 is a perspective view when the internal components including the driving means for opening/closing a panel of the second embodiment constituting the makeup table according to the embodiment of the present invention are viewed from the other side of the rear portion, and FIG. 14 is a front view when internal components including the second embodiment of the driving means for opening/closing a panel of the second embodiment constituting the makeup table according to the embodiment of the present invention are viewed from one side. In the following descriptions of the driving means for open/closing a panel of the second embodiment, the same reference numerals are assigned to components which are the same as the components of the driving means for opening/closing a panel of the first embodiment, and detail descriptions thereof are omitted.

As shown in FIGS. 12 to 14, the second embodiment of the driving means for opening/closing a panel includes a forward/rearward rotation motor 810 which is provided behind the support case 200 and is rotatable forward or rearward, a rotating shaft 820 which is connected to a rotary shaft of the forward/rearward rotation motor 810 via an interlocking track belt 822, is rotatably supported by one or more supports 220 configured in the support case 200, and includes both end portions respectively having a pulley 825, a rotating pulley 825 which is rotatably provided in front of each of both side surface of the support case 200, a driving track belt 824 which connects the rotating pulley 825 and the pulleys of both end portions of the rotating shaft 820 to each other, and a movement block body 826 which is fixed to the driving track belt 824 and is connected to a guide roller constituting a panel movement guide means in an upper end portion of the movement block body 826.

Here, a movement long hole (not shown) is formed to parallel with the driving track belt 824 in an upper surface flange portion of the support case 200 that a connection portion of the movement block body 826 connected to the guide roller is movable.

A bearing member or a rolling member which rotatably supports the rotating shaft 820 is provided between the rotating shaft 820 and the support 220.

An operation of the driving means for opening/closing a panel configured as described above will be described along with an operation of the panel movement guide means.

Subsequently, the panel movement guide means for guiding the movement of the opening/closing means 700 includes a guide rail 910 which is provided on both wall surfaces of an upper end portion of the accommodation space of the table body 100 including the opening/closing panel 700 or both wall surfaces of an upper end portion of the support case 300, and a guide roller (not shown) which is rotatably provided on one end portion of both edges of the opening/closing panel 700.

In the operations of the driving means for opening/closing a panel and the panel movement guide means of the first embodiment configured as described above, the forward/rearward rotation motor 810 rotates in one direction (forward direction), the rotating shaft 820 rotates, the rotation shaft 230 connected by the connection frame 830 rotates together with the rotation of the rotating shaft 820, the guide roller included in the opening/closing panel 700 moves along the guide rail 910 while a front end portion of the opening/closing panel 700 to which the rotation shaft 230 is coupled is pulled, and thus, the opening/closing panel 700 is opened in proportion to the number of rotations of the forward/rearward rotation motor 810.

In this case, the opening/closing panel 700 is opened or closed while being more stably supported by the interlocking link member 840 which is coupled to and interlocked with the rotation shaft 230.

In a case where the opening/closing panel 700 is adjusted to an original position at which the opening/closing panel 700 is located at a planar position or to an angle smaller than an angle when the opening/closing panel 700 completely stands uprightly, the adjustment is realized by controlling forward or rearward rotation directions of the forward/rearward rotation motor 810 and the number of rotations (rotation amount) by an operation of an operation switch of the control panel described later.

In the operations of the driving means for opening/closing a panel and the panel movement guide means of the second embodiment configured as described above, the forward/rearward rotation motor 810 rotates in one direction (forward direction), the rotating shaft 820 rotates, the driving track belt 824 is driven together with the rotation of the rotating shaft 820, the movement block body 825 fixed to the driving track belt 824 moves, the guide roller of the panel movement guide means included in the front end portion of the opening/closing panel 700 moves, the guide roller included in the opening/closing panel 700 moves along the guide rail 910 while the front end portion of the opening/closing panel 700 moves rearward, and thus, the opening/closing panel 700 is opened in proportion to the number of rotations of the forward/rearward rotation motor 810.

Next, the power supply unit connected to supply power to the cold generation means, the driving means for lifting/lowering, and the driving means for opening/closing a panel includes a power wiring circuit module CM (refer to FIG. 12) for supplying power to the cold generation means, the driving means for lifting/lowering, and the driving means for opening/closing a panel, and a power cable which is connected to supply the power wiring circuit module and is drawn out from the table body.

Here, in the power supply unit, a power connection port which is configured instead of the power cable or together with the power cable and is connected to an external power connection cable may be electrically connected to the circuit module and may be configured on one side of the table body 100.

Next, the control panel 150 includes a plurality of control operation units configured on the one side of the table body 100 to control the circuit module and a power light emitter 151 (refer to FIG. 22) capable of checking whether or not power is supplied to the circuit module.

Figure 22:
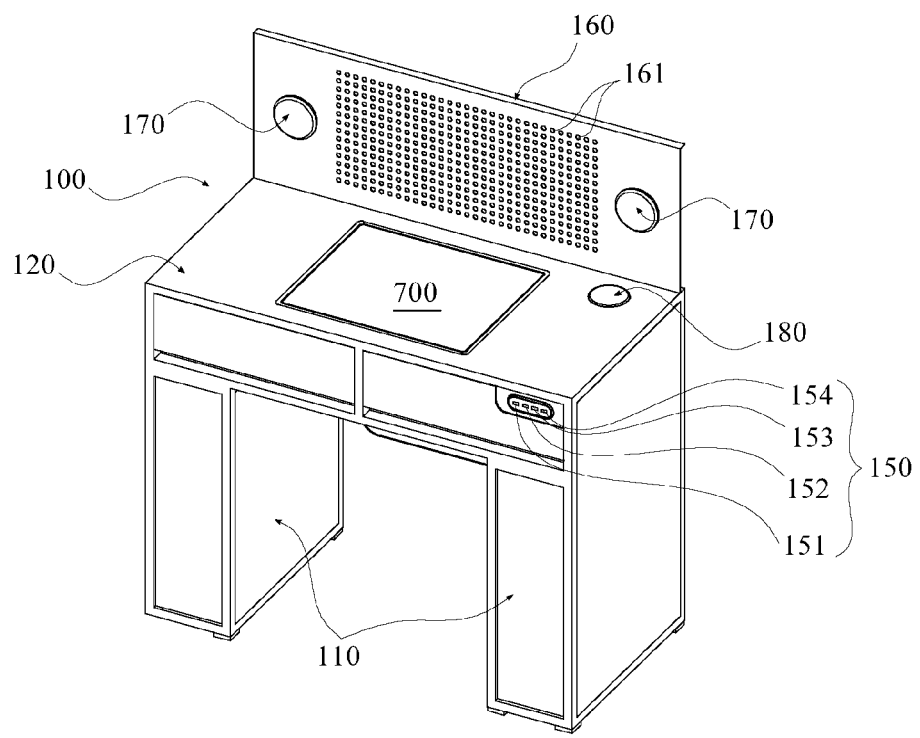
FIG. 22 is a view showing a makeup table according to still another embodiment of the present invention and shows a state where an opening/closing panel is closed.

The control operation unit a power button 152 which is switched to turn on or off the entire power, a lifting control button 152 configured to control the forward/rearward driving and the rotation amount of the linear motor to control the operation of the driving means for lifting/lowering and to be returned to an original position after the operation, and an opening/closing control button 154 configured to control the forward/rearward driving and the rotation amount of the forward/rearward rotation motor to control the operation of the driving means for lifting/lowering and to be returned to an original position after the operation (refer to FIG. 22).

Figure 15:
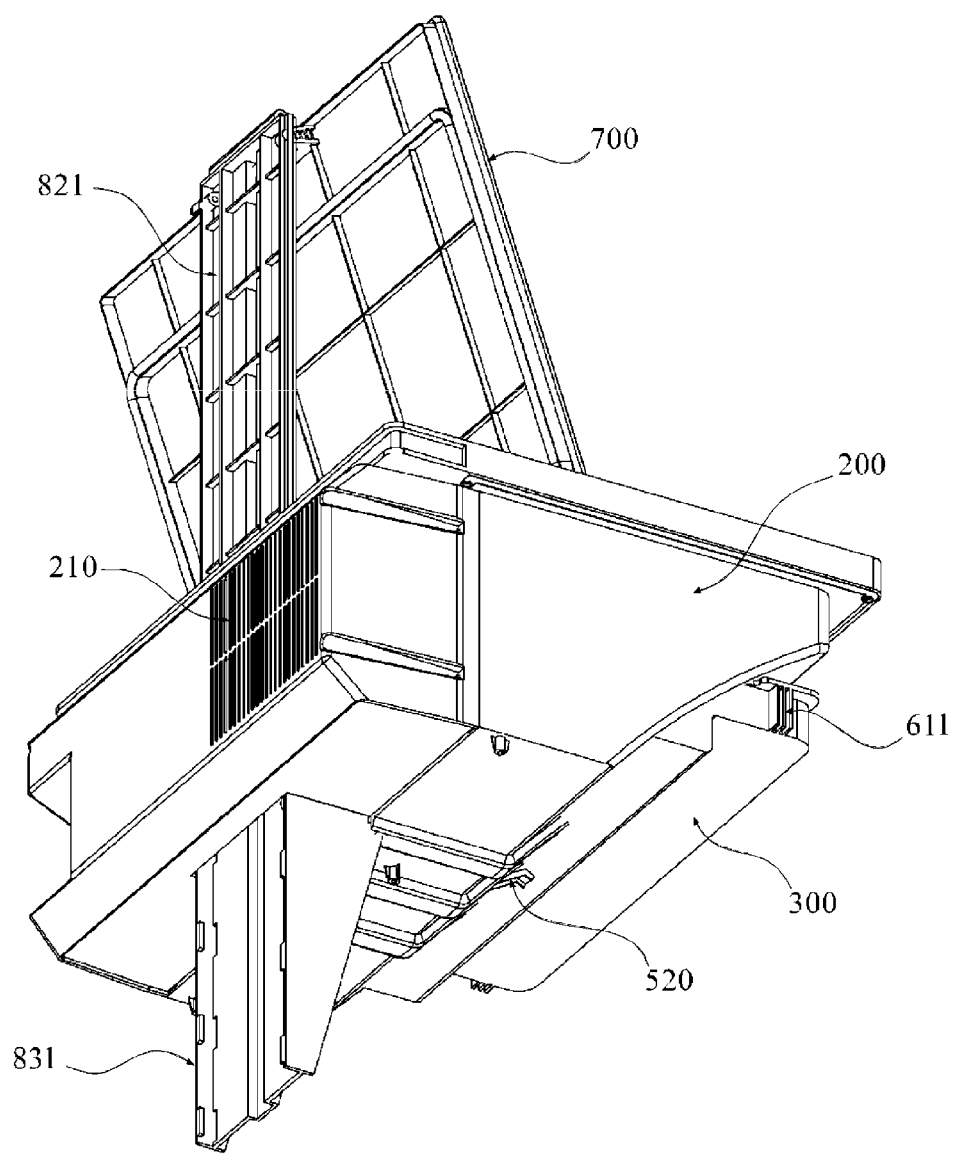
FIG. 15 is a front view when internal components constituting a makeup table according to another embodiment of the present invention are viewed from one side from a rear portion.
Figure 16:
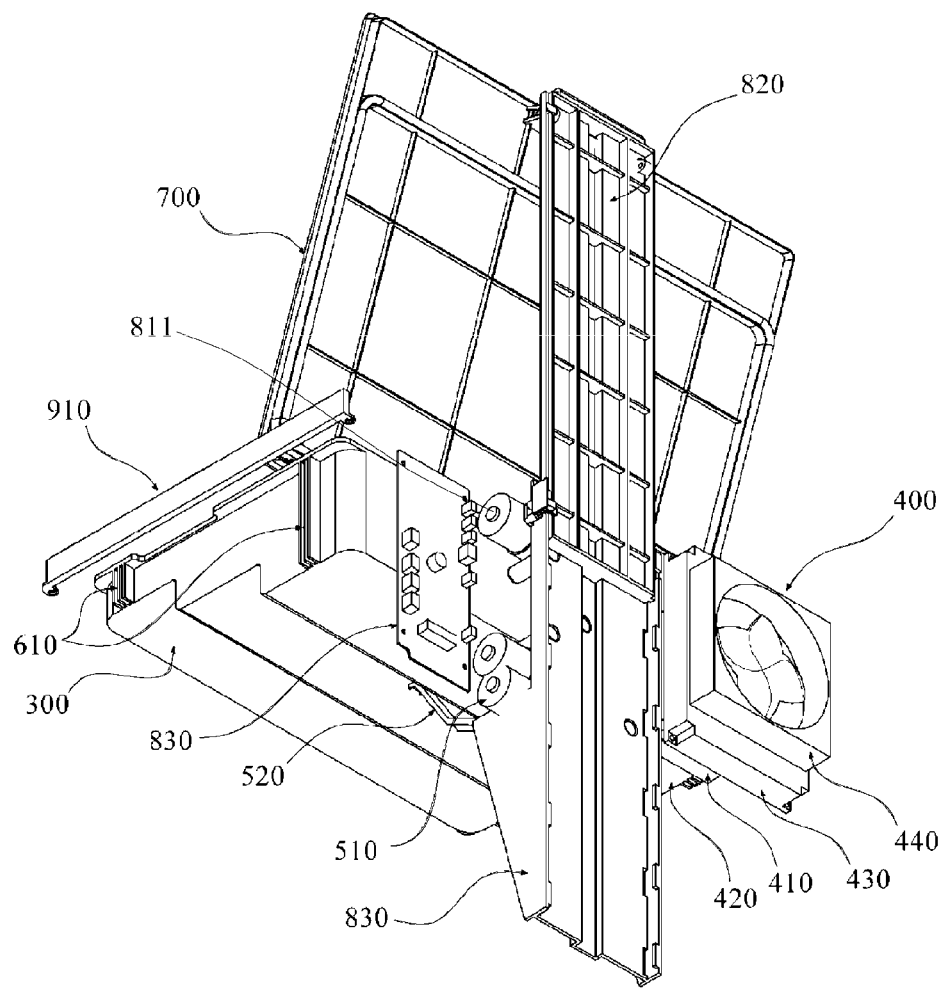
FIG. 16 is a front view when the internal components constituting the makeup table according to another embodiment of the present invention are viewed from the other side from the rear portion.
Figure 17:
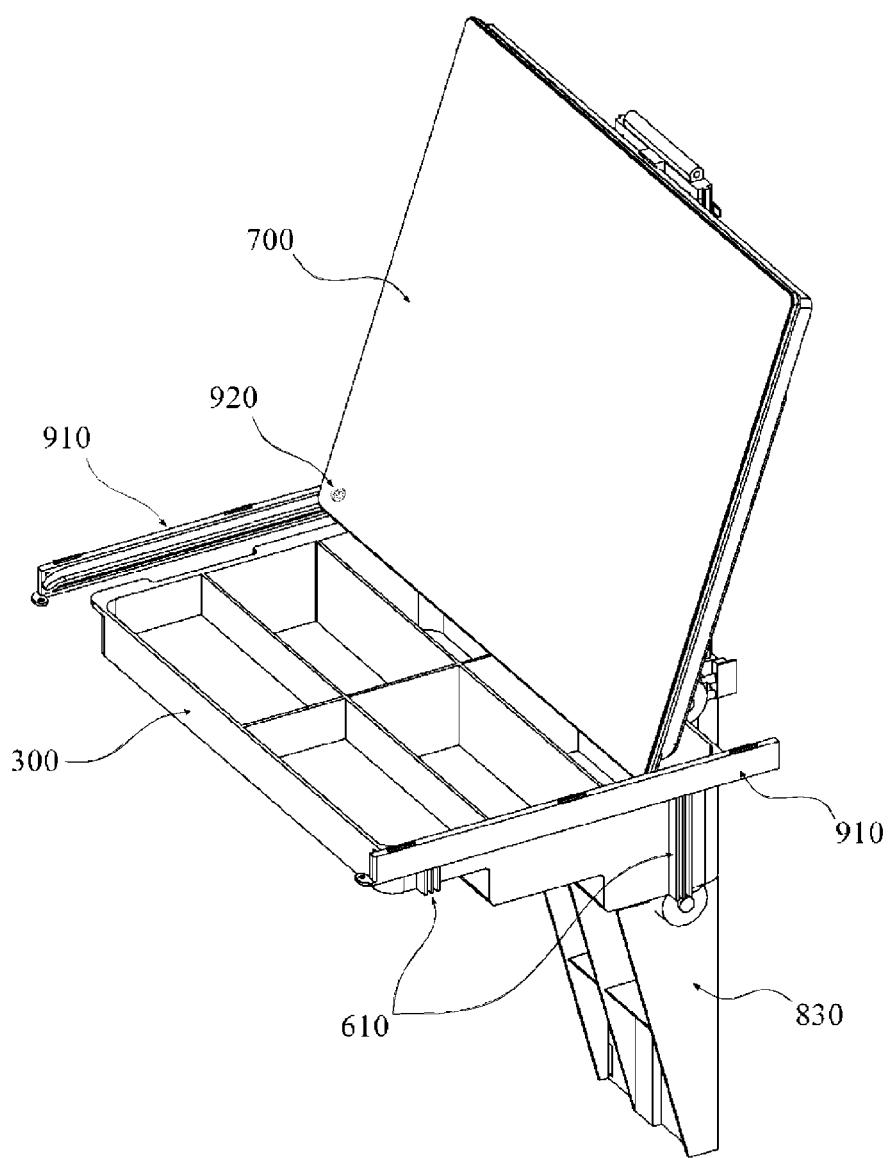
FIG. 17 is a front view when the internal components constituting the makeup table according to another embodiment of the present invention are viewed from one side from a front portion.

Next, a makeup table according to another embodiment of the present invention will be described in detail with reference to FIGS. 15 to 17. FIG. 15 is a front view when components constituting a makeup table according to another embodiment of the present invention are viewed from one side from a rear portion, FIG. 16 is a front view when the internal components constituting the makeup table according to another embodiment of the present invention are viewed from the other side from the rear portion, and FIG. 17 is a front view when the internal components constituting the makeup table according to another embodiment of the present invention are viewed from one side from a front portion.

In descriptions with respect to the following makeup table according to another embodiment of the present invention, the same reference numerals are assigned to components which are the same as or similar to those of the makeup tables of the above-described embodiments, and detail descriptions thereof are simplified or omitted. In another embodiment of the makeup table, components of driving the opening/closing panel 700 and the cosmetic accommodation case 300 are different, and thus, only the components are described.

In the makeup table of another embodiment of the present invention, a driving means for lifting/lowering the cosmetic accommodation case 300 includes a forward/rearward rotation motor (first forward/rearward rotation motor) 511 which is provided on one side of the support case 200 and is rotatable forward or rearward, a rotating shaft (not shown) which receives a forward/rearward rotation force of the forward/rearward rotation motor (first forward/rearward rotation motor) 511, and one or more contact driving bars 520 of which one end portion is connected to the rotating shaft and the other end portion is provided to contact-support a rear surface of the cosmetic accommodation case 300, the other end portion being provided to obliquely contact-support the rear surface of the cosmetic accommodation case 300.

Here, a gear train configured to reduce a rotation ratio between the forward/rearward rotation motor (first forward/rearward rotation motor) 511 and the rotating shaft may be provided. In addition, the contact driving bar 520 may be formed to be bent at a predetermined angle at an intermediate portion thereof or at a ⅔ point from the other end portion thereof.

In the driving means for lifting/lowering configured as described above, the first forward/rearward rotation motor 511 rotates in one direction (forward direction) and the rotating shaft rotates by a predetermined degree, one end portion of the contact driving bar 520 rotates, and thus, the other end portion of the contact driving bar 520 rotates with the one end portion as an axis. Accordingly, the cosmetic accommodation case 300 is lifted, and in this case, the cosmetic accommodation case 300 is lifted while being stably guided by a case guide means described later.

Thereafter, in a case where the cosmetic accommodation case 300 is intended to be located at an original position or to be located below an uppermost position, if the first forward/rearward rotation motor 511 is driven rearward, the other end portion of the contact driving bar 520 reversely rotates with the one end portion with an axis, a force supporting the cosmetic accommodation case 300 is reduced, and the cosmetic accommodation case 300 is lowered by own weight while being stably guided by the case guide means described later.

The forward/rearward rotation direction and the rotation amount of the first forward/rearward rotation motor 511 are controlled by operating an operation switch of the control panel.

Here, in order to more smoothly perform the lifting/lowering operation of the cosmetic accommodation case 300 by the contact driving bar 520, a rear surface of the cosmetic accommodation case 300 may be inclined toward one side, and a rotation roller which is freely rotatable may be provided on an end portion of the contact driving bar 520.

Subsequently, in another embodiment, the case guide means includes one or more guide grooves (not shown) which are formed on one of facing surfaces (side surfaces facing each other) of the support case 200 and the cosmetic accommodation case 300, and one or more guide protrusions 611 which are formed on the other of the facing surfaces of the support case 200 and the cosmetic accommodation case 300 and are guided along the guide grooves (not shown).

In the drawings, a case where the guide protrusion 611 of the case guide means is formed in a linear guide protrusion on a side surface of the cosmetic accommodation case 300 is shown.

Next, in another embodiment, the driving means for opening/closing a panel includes a forward/rearward rotation motor (second forward/rearward rotation motor) 811 which is provided on one side of the support case 200 and is rotatable forward or rearward, a gear which is provided in an end portion of the second forward/rearward rotation motor 811, a linear movement frame 821 which is rotatably coupled to an upper end portion of the rear surface side of the opening/closing panel, includes a rack gear engaging with the gear, and linearly moves in a vertical direction, and a linear movement support frame 831 which is installed below the support case 200 and movably supports both end portions of the linear movement frame 831.

Here, a gear train configured to reduce a rotation ratio between the gear of the second forward/rearward rotation motor 811 and the rack gear of the linear movement frame 821 may be provided.

In an operation of the driving means for opening/closing a panel configured as described above, the second forward/rearward rotation motor 811 rotates in one direction (forward direction), the linear movement frame 821 is lifted toward the upper portion of the table body 100 by the rack gear engaging with the gear of the end portion while being guided by the linear movement support frame 831.

Accordingly, the opening/closing panel 700 rotatably coupled to the upper end portion of the linear movement frame 821 moves from the flat surface state to a state where the opening/closing panel 700 stands with a predetermined angle by pulling the linear movement frame 821, and in this case, the opening/closing panel 700 is guided while being stably guided by the panel guide means, and a standing angle of the opening/closing panel 700 is realized by the movement (rotation amount of the second forward/rearward rotation 811) of the linear movement frame 821.

Thereafter, in a caser where the opening/closing panel 700 is intended to be adjusted to an angle smaller than an angle of the planar original position or a completely uprightly standing angle, the second forward/rearward rotation motor 811 is driven in the rearward direction. The forward/rearward rotation direction and the rotation amount of the second forward/rearward rotation motor 811 are controlled by operating an operation switch of the control panel.

Internal components constituting the makeup table of another embodiment described as above, that is, the components for driving the opening/closing panel 700 and the cosmetic accommodation case 300 may be configured to combine with the internal components constituting the makeup table of the above-described embodiment.

In other words, as the makeup table according to the present invention, the driving means for lifting/lowering, the case guide means, the driving means for opening/closing a panel, and the panel movement guide means of the above-described embodiments may be configured to combine with each other.

For example, the makeup table according to the present invention may include the driving means for lifting/lowering of the first or second embodiment and a driving means for opening/closing a panel of another makeup table, or may include the driving means for opening/closing a panel of the first and second embodiment and a driving means for lifting/lowering of another embodiment.

In addition, in the makeup table according to the present invention, the driving means for lifting/lowering of the first or second embodiment may be set to a main driving means for lifting/lowering or a first driving means for lifting/lowering, and the driving means for lifting/lowering of another embodiment may be set to a sub driving means for lifting/lowering or a second driving means for lifting/lowering. In addition, the driving means for opening/closing a panel of the first or second embodiment may be set to a main driving means for opening/closing a panel or a first driving means for opening/closing a panel, and the driving means for opening/closing a panel of another embodiment may be set to a sub driving means for opening/closing a panel or a second driving means for opening/closing a panel.

Of course, some components of the driving means for lift/lowering and the driving means for opening/closing a panel of the respective embodiments may be configured to be replaced or combined with each other, and the case guide means and the panel movement guide means may be configured to be combined with each other.

Meanwhile, the makeup table according to the present invention may further include a manual opening/closing means which is configured to be opened or closed manually to approach the cosmetic accommodation case.

Figure 18:
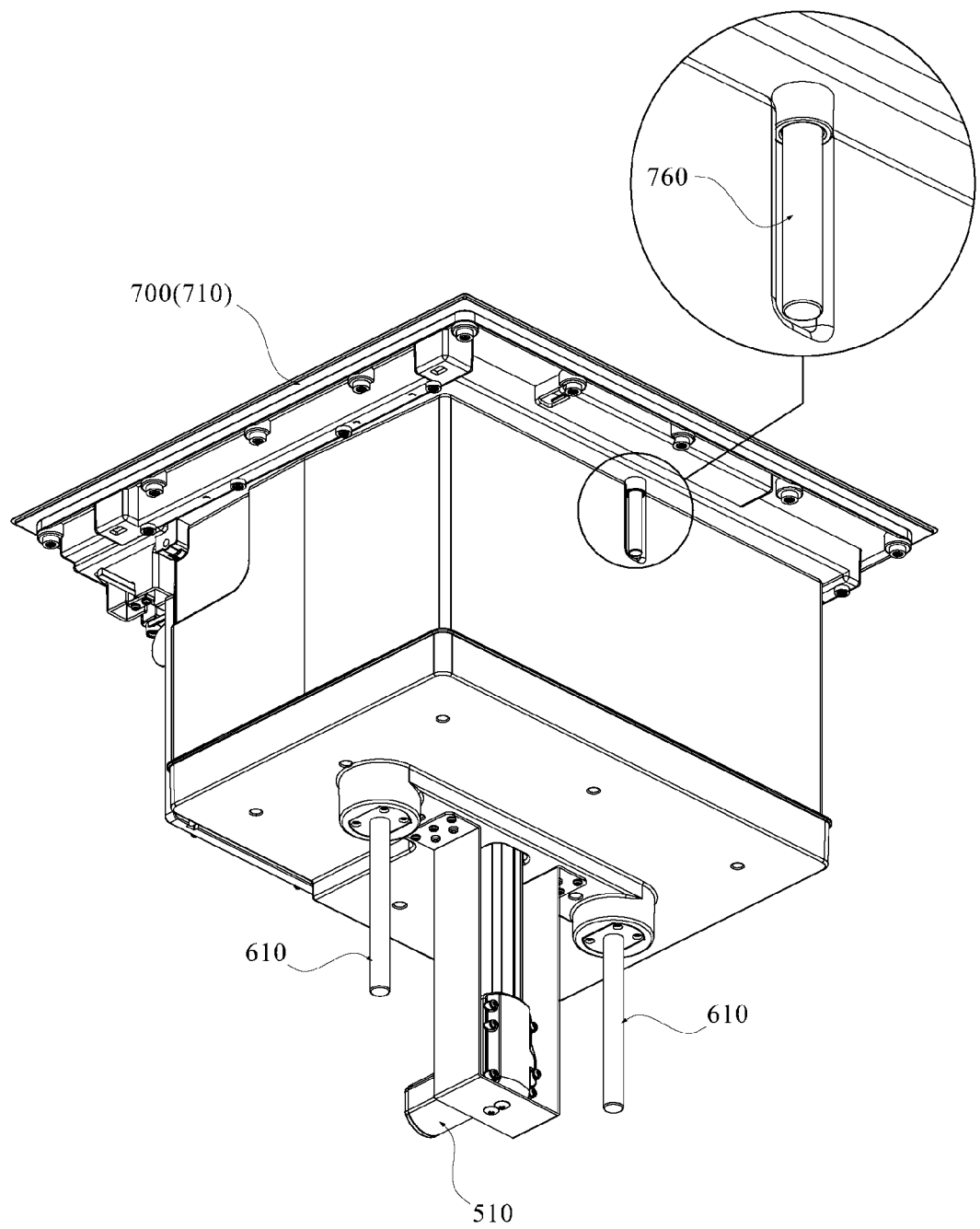
FIG. 18 is a view showing a side on which one component of a locking/unlocking unit constituting a manual opening/closing means of the makeup table according to the present invention is provided.
Figure 19:
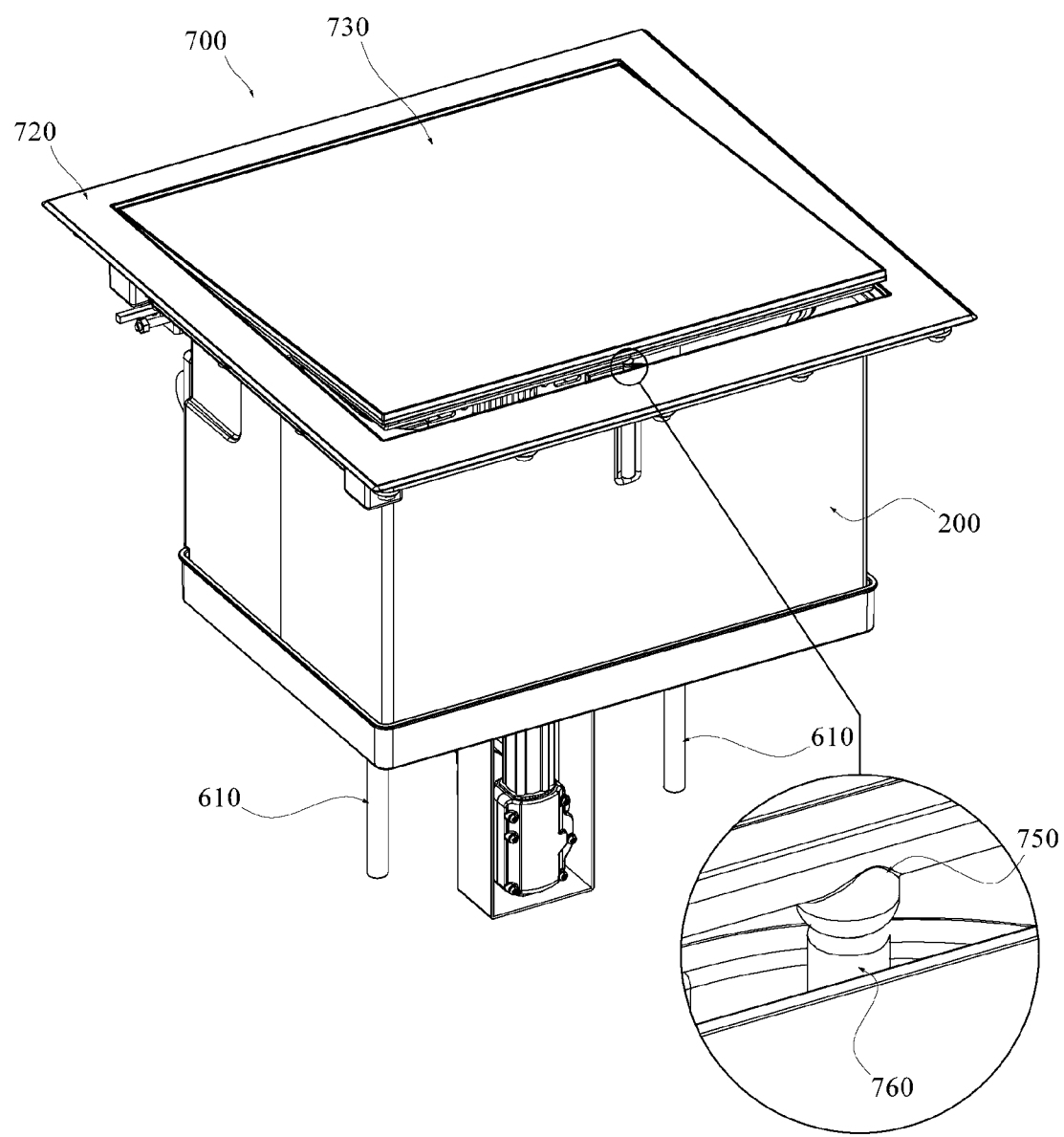
FIG. 19 is a view showing a state where a manual auxiliary opening/closing panel constituting the manual opening/closing means of the makeup table according to the present invention is partially opened.
Figure 20:
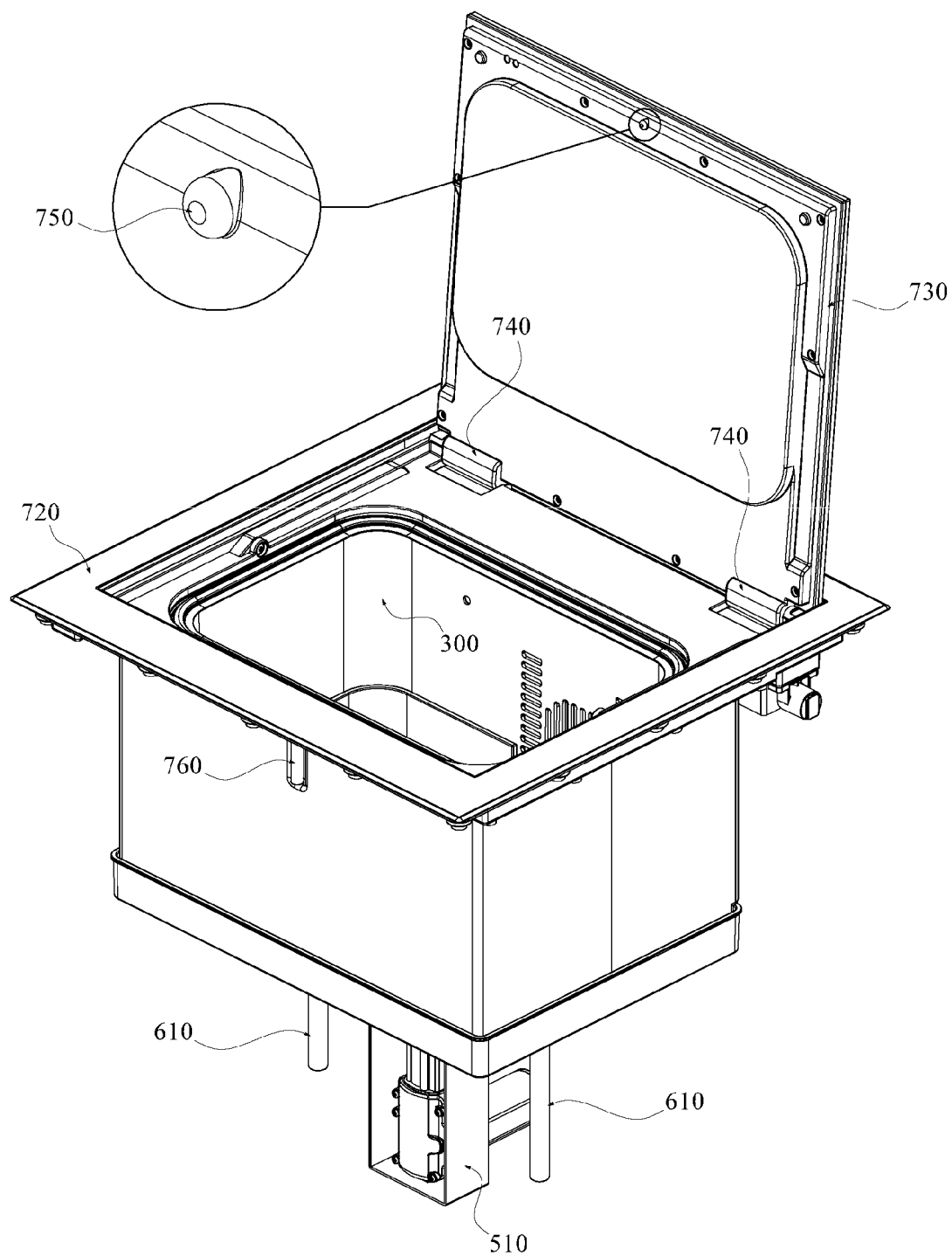
FIG. 20 is a view showing a state where the manual auxiliary opening/closing panel constituting the manual opening/closing means of the makeup table according to the present invention is fully opened.
Figure 21:
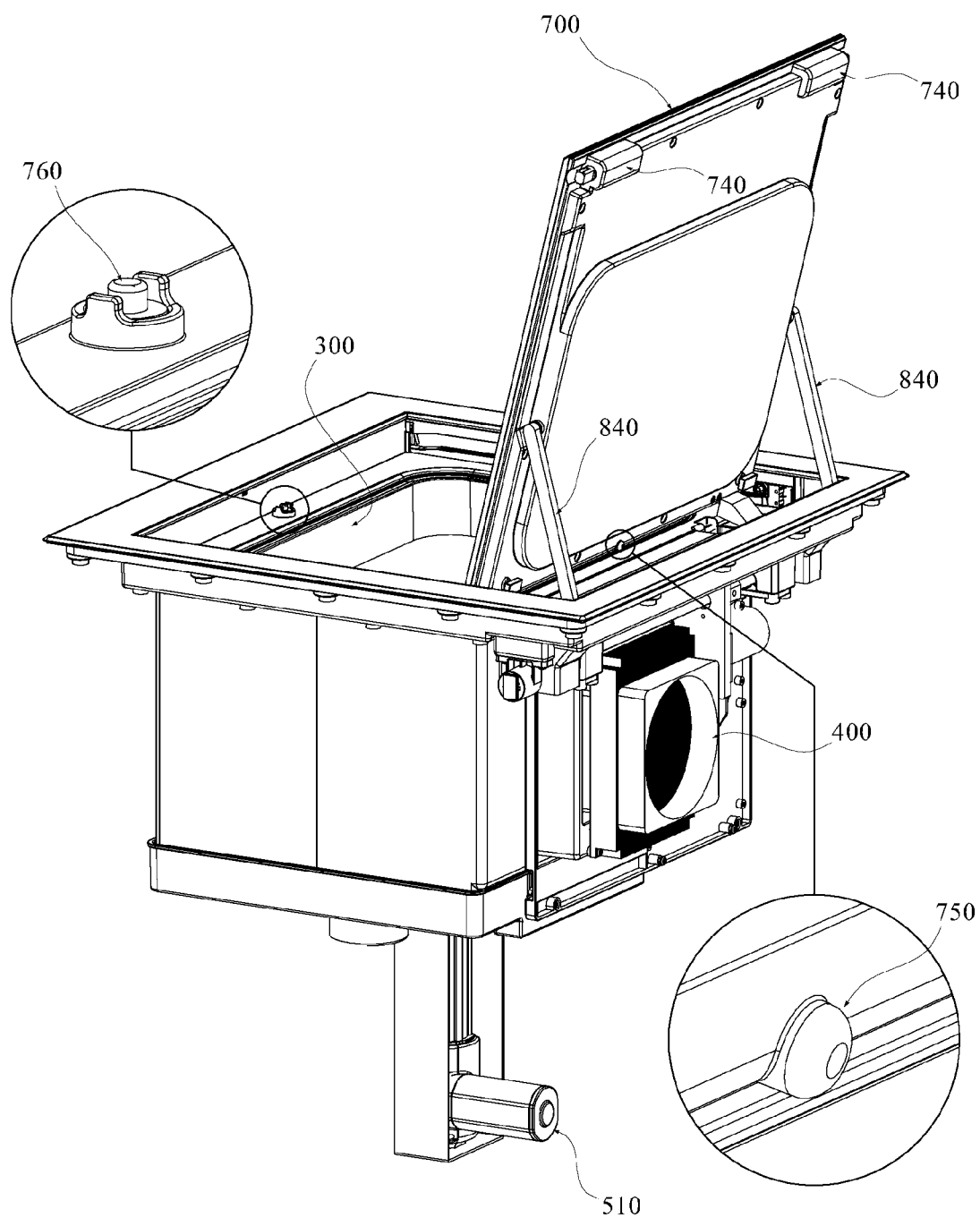
FIG. 21 is a view showing a state where the opening/closing panel having the manual auxiliary opening/closing panel in the makeup table according to the present invention is operated by the driving means for opening/closing a panel to be fully opened.

The manual opening/closing means constituting the makeup table according to the present invention will be described in detail with reference to FIGS. 18 to 21. FIG. 18 is a view showing a side on which one component of a locking/unlocking unit constituting a manual opening/closing means of the makeup table according to the present invention is provided, FIG. 19 is a view showing a state where a manual auxiliary opening/closing panel constituting the manual opening/closing means of the makeup table according to the present invention is partially opened, FIG. 20 is a view showing a state where the manual auxiliary opening/closing panel constituting the manual opening/closing means of the makeup table according to the present invention is fully opened, and FIG. 21 is a view showing a state where the opening/closing panel having the manual auxiliary opening/closing panel in the makeup table according to the present invention is operated by the driving means for opening/closing a panel to be fully opened.

As shown in FIGS. 18 to 21, the manual opening/closing means constituting the makeup table according to the present invention includes an edge frame 720 which forms an opening portion having a predetermined size inside the edge frame and an edge portion of the opening/closing panel 700, a manual auxiliary opening/closing panel 730 which is provided in the opening portion inside the edge frame 720, a hinge unit 740 which is provided on both side of one end portion of the manual auxiliary opening/closing panel 730 and is rotatably fixed to the edge frame 720 such that the manual auxiliary opening/closing panel 730 rotates with the one end portion as an axis, an elastic member (not shown) which is provided in the hinge unit 740 and applies an elastic force to the manual auxiliary opening/closing panel 730 in an opening direction, and locking-unlocking units 750, 760 which are provided in a center portion of the other end of the manual auxiliary opening/closing panel 730 and the edge frame and are configured to lock or unlock the other end portion of the manual auxiliary opening/closing panel 730.

The edge frame 720 and the manual auxiliary opening/closing panel 730 constitute the opening/closing panel 700 described in the embodiments.

The hinge unit 740 is not particularly limited as long as the manual auxiliary opening/closing panel 730 is rotatably coupled to the edge frame 720 with one end portion as an axis, and may adopt a known hinge unit.

Next, the locking-unlocking units 750 and 760 include a first locking-unlocking member 750 configured at the center portion on the other end of the manual auxiliary opening/closing panel 730 and a second locking-unlocking member 760 which is provided in the edge frame 720 at a position corresponding to the first locking-unlocking member 750 in a state where the manual auxiliary opening/closing panel 730 is closed and is configured to be locked-unlocked in conjunction with the first locking-unlocking member 750.

The first and second locking-unlocking members 750 and 760 of the locking-unlocking unit are not particularly limited as long as the locking state is maintained in a closed state of the manual auxiliary opening/closing panel 730 and the unlocking state is realized in which the locking state is released if the manual auxiliary opening/closing panel 730 is pressed or an operation button is operated in the locking state, and a locking-unlocking member may be adopted.

For example, the locking-unlocking unit may be a push-type locking-unlocking member which is locked or unlocked when pressed.

In this way, the makeup table according to the present invention further includes the manual opening/closing means. Accordingly, in a case where the drive unit for opening/closing a panel is not used when blackout or failure occurs, that is, in a case where the panel cannot be automatically opened or closed or when the panel is intended to be immediately closed after the cosmetics are taken out without operating the drive unit for opening/closing a panel, the manual auxiliary opening/closing panel 730 can be manually opened such that the cosmetics are taken out, and frequent operations of the drive unit for opening/closing a panel are prevented such that power consumption is reduced.

Meanwhile, a makeup table according to still another embodiment of the present invention will be described with reference to FIG. 22. FIG. 22 is a view showing a makeup table according to still another embodiment of the present invention and shows a state where an opening/closing panel is closed.

In descriptions with respect to the following makeup table according to still another embodiment of the present invention, the same reference numerals are assigned to components which are the same as or similar to those of the makeup tables of the above-described embodiments, and detail descriptions thereof are simplified or omitted. In still another embodiment of the makeup table, components constituting the table body 100 are different, and thus, only the components are described.

As shown in FIG. 22, the makeup table according to still another embodiment of the present invention may further include a rear table frame 160 which is configured to stand uprightly on a rear end portion of the table body 100, and a plurality of mounting holes 161 on which an article such as an ear phone or an interior article can be mounted may be formed in the rear table frame 160.

Moreover, a Bluetooth speaker (an electric connection port exposed to the outside) 170 configured to receive the power from the circuit module is provided in the rear table frame 160. Of course, the Bluetooth speaker may be made in one piece, and may be interlocked with the LED display panel as the opening/closing panel 700, and may be detachably mounted to the rear table frame. In a case where the Bluetooth speaker is detachably mounted, a speaker mounting hole is formed in the rear table frame, and the speaker mounting hole is formed with a drawing hole for connecting the speaker power cable to the electrical connection port of the circuit module. Of course, the speaker mounting hole may be provided with a connection port of a power cable drawn from the circuit module so that the speaker mounting hole can be directly connected to the power supply.

In addition, the makeup table further includes a wireless charger 180 which is configured integrally with the table body 100 and configured (electrical connection port exposed to the outside) to receive power from the circuit module so as to wirelessly charge a smartphone. Of course, the wireless charger may be configured to be detachable, and in this case, the table body (100) is formed with a wireless charger mounting hole, and a withdrawal hole which can connect the charger power cable to the electric connection port of the circuit module is formed in the wireless charger mounting port. Even in the case of the wireless charger, the wireless charger mounting port is provided with a connection port of the power cable drawn from the circuit module to perform the power transfer directly from the wireless charger mounting port or connect the wired charger.

In addition, the makeup table may further include a halogen lamp as an anion generator and/or a sterilizer configured to receive power from the circuit module on one side inside the cosmetic accommodation case 300.

The makeup table according to still another embodiment may be configure to combine with the internal components of the above-described embodiments.

The makeup table of the present invention as described above may be made by applying to be equipped with a built-in form or built-in (built-in) product.

According to the makeup tables according to the present invention as described above, it possible to provide refrigerating function to store the cosmetics required to be refrigerated, to adjust the state of use of the mirror, and to minimize movements of the cosmetics to be used to improve performance and convenience.

Moreover, according to the present invention, a functional makeup table is provided which adds a function which can be associated with a smart phone terminal and can perform music or smartphone charging at the same time, and thus, a choice of consumer preferences is broaden and competitiveness of a product increases.

In addition, according to the present invention, the cosmetics can be easily taken out through a manual auxiliary opening/closing panel, and thus, usability and functionality can be further improved.

INDUSTRIAL APPLICABILITY

The present invention can be applied to a makeup table which is a dressing table storing and maintaining cosmetics at a predetermined temperature.

The invention claimed is:

1. A makeup table comprising:
 a table body which includes an accommodation space of which one side is open;
 a support case having an opened upper portion which is provided in the accommodation space of the table body;
 a cosmetic accommodation case which is detachably installed in the support case, and accommodates and stores cosmetics;
 a cold generation means which is configured on one side of the cosmetic accommodation case and provides cold air to the cosmetic accommodation case;
 a driving means for lifting/lowering which is configured in the table body and lifts or lowers the cosmetic accommodation case, wherein the driving means for lifting/lowering includes a linear motor of which a lifting/lowering shaft penetrates a bottom surface of the support case and is connected to the cosmetic accommodation case;
 a case guide means which is configured between the support case and the cosmetic accommodation case and guides the lifting or lowering of the cosmetic accommodation case;
 an opening/closing panel which has a reflective surface for providing a mirror function and opens or closes an opening surface of the accommodation space of the table body;
 a driving means configured in the table body and drives the opening/closing panel from a flat surface state to a standing state at a predetermined angle;
 a panel movement guide means which is configured in an upper portion of the accommodation space and guides a movement of the opening/closing panel by driving the driving means for driving the opening/closing panel;
 a power supply unit which is connected to supply power to the cold generation means, the driving means for lifting/lowering, and the driving means for driving the opening/closing panel; and
 a control panel which is configured on one side of the table body and controls the cold generation means, the driving means for lifting/lowering, the driving means for driving the opening/closing panel, and the power supply unit.

2. The makeup table of claim 1, wherein the driving means for lifting/lowering includes
 an opening slot which is open in a vertical direction in each of both side surface of the support case,
 a connection member which is formed on both side surface of the cosmetic accommodation case and protrudes through the opening slot,
 a feed screw member which is formed to be parallel with the opening slot on both side surfaces of the support case and to which the connection member is movably coupled, and
 a drive motor which is movable forward or rearward to rotate the feed screw member.

3. The makeup table of claim 1, wherein the driving means for lifting/lowering includes
 a forward/rearward rotation motor which is provided on one side of the support case and is rotatable forward or rearward,
 a rotating shaft which receives a forward/rearward rotation force of the forward/rearward rotation motor, and
 one or more contact driving bars of which one end portion is connected to the rotating shaft and the other end portion is provided to contact-support a rear surface of the support case, the other end portion being provided to obliquely contact-support the rear surface of the support case.

4. The makeup table of claim 1, wherein the case guide means includes
one or more guide holes which are formed on a bottom surface of the support case, and
a guide member of which one end is coupled to the cosmetic accommodation case such that the guide member is sliding-movable vertically through the guide hole.

5. The makeup table of claim 1, wherein the case guide means includes
one or more guide grooves which are formed on one of facing surfaces of the support case and the cosmetic accommodation case, and
one or more guide protrusions which are formed on the other of the facing surfaces of the support case and the cosmetic accommodation case and are guided along the guide grooves.

6. The makeup table of claim 1, wherein the driving means for driving the opening/closing panel includes:
a forward/rearward rotation motor which is provided on one side of the support case and is rotatable forward or rearward,
a rotating shaft which is connected to a rotary shaft of the forward/rearward rotation motor,
a rotation shaft which is formed on one side of a rear surface of the opening/closing panel,
a connection frame of which one end portion is coupled to each of both end portions of the rotation shaft and the other end portion is coupled to the rotating shaft, and
an interlocking link member of which one end portion is fixedly coupled to both end portions of the rotation shaft and the other end portion is rotatably coupled to an intermediate portion of both edges of the opening/closing panel or a side below the intermediate portion.

7. The makeup table of claim 1, wherein the driving means for driving the opening/closing panel includes:
a forward/rearward rotation motor which is provided on one side of the support case and is rotatable forward or rearward,
a rotating shaft which is connected to a rotary shaft of the forward/rearward rotation motor via an interlocking track belt, is rotatably supported by one or more supports configured in the support case, and includes both end portions respectively having a pulley,
a rotating pulley which is rotatably provided in front of each of both side surface of the support case,
a driving track belt which connects the rotating pulley and the pulleys of both end portions of the rotating shaft to each other, and
a movement block body which is fixed to the driving track belt and is connected to a guide roller constituting a panel movement guide means in an upper end portion of the movement block body.

8. The makeup table of claim 1, wherein the driving means for driving the opening/closing panel includes:
a forward/rearward rotation motor which is provided on one side of the support case and is rotatable forward or rearward,
a gear which is provided in an end portion of the forward/rearward rotation motor,
a linear movement frame which includes a rack gear engaging with the gear and linearly moves in a vertical direction, and
a linear movement support frame which is installed in the support case, movably supports both end portions of the linear movement frame, and is rotatably coupled to an upper end portion on a rear surface side of the opening/closing panel in an upper end portion of the linear movement support frame.

9. The makeup table of claim 1, wherein the panel movement guide means includes
a guide rail which is provided on both wall surfaces of an upper end portion of the accommodation space of the table body and both wall surfaces of an upper end portion of the support case, and
a guide roller which is rotatably provided on both sides of a lower end portion of the opening/closing panel and is guided along the guide rail.

10. The makeup table of claim 1, wherein a heat insulating cover member is provided in the opening/closing panel on a side facing the cosmetic accommodation case,
a packing member is provided in one of an edge periphery on a rear surface side of the heat insulating cover member and an upper end edge periphery of the accommodation space of the table body so as to prevent cold from escaping, and
a stepped portion with which the packing member comes into close contact is formed in the other of the upper end edge of the accommodation space of the table body and the edge periphery on the rear surface side of the heat insulating cover member.

11. The makeup table of claim 1, wherein the cold generation means includes a thermoelectric element which is provided on one side of the cosmetic accommodation case and generates a Peltier Effect, a cold sink of which one side communicates with the cosmetic accommodation case and the other side is provided on one surface of the thermoelectric element, a heat sink which is provided on the other surface of the thermoelectric element, and a heat dissipation fan which is provided in the heat sink and discharges generated heat,
a grill is formed on one surface of the support case facing the heat dissipation fan, and
a bottom portion of the cosmetic accommodation case is stepped to have different heights and is configured to be divided into a plurality of partition walls.

12. The makeup table of claim 1, wherein the power supply unit includes a power wiring circuit module for supplying power to the cold generation means, the driving means for lifting/lowering, and the driving means for driving the opening/closing panel, and a power cable which is connected to supply the power wiring circuit module and is drawn out from the table body,
the control panel includes a plurality of control operation units configured on one side of the table body to control the power wiring circuit module and a power light emitter which checks whether or not the power is applied to the power wiring circuit module, and
the plurality of control operation unit includes a power button which is switched to turn on or off the power of the power wiring circuit module, a first motor control button which controls forward/rearward driving of a forward/rearward rotation motor of the driving means for lifting/lowering, and a second motor control button which controls forward/rearward driving of the forward/rearward rotation motor of the driving means for driving the opening/closing panel.

13. The makeup table of claim 12, further comprising:
a rear table frame which is configured to stand uprightly on a rear end portion of the table body and includes a plurality of mounting holes,
a Bluetooth speaker configured to receive the power from the power wiring circuit module is provided in the rear table frame, and a smartphone wireless charger configured to receive the power from the power wiring circuit module is provided in the table body.

14. The makeup table of claim 1, further comprising:
a manual opening/closing means which is configured in the opening/closing panel and is configured to be manually opened or closed to open or close the opening surface of the accommodation space of the table body.

15. The makeup table of claim 1, wherein the opening/closing panel includes
an edge frame which forms an opening portion having a predetermined size inside the edge frame,
a manual auxiliary opening/closing panel which is provided in the opening portion inside the edge frame,
a hinge means which is provided on both side of one end portion of the manual auxiliary opening/closing panel and is rotatably fixed to the edge frame such that the manual auxiliary opening/closing panel rotates with the one end portion as an axis,
an elastic member which is provided in the hinge means and applies an elastic force to the manual auxiliary opening/closing panel in an opening direction, and
a locking-unlocking unit which is provided in a center portion of the other end of the manual auxiliary opening/closing panel and the edge frame and is configured to lock or unlock the other end portion of the manual auxiliary opening/closing panel.

16. The makeup table of claim 1, wherein the opening/closing panel includes a monitor-integrated computer or a tablet including software and hardware for executing at least one of the functions of wired/wireless internet, Bluetooth, or mirroring.

* * * * *